US012659065B2

(12) United States Patent
Senoo et al.

(10) Patent No.: US 12,659,065 B2
(45) Date of Patent: Jun. 16, 2026

(54) OPTICAL ACCESS SYSTEM AND MONITORING METHOD

(71) Applicant: NTT, Inc., Tokyo (JP)

(72) Inventors: Yumiko Senoo, Musashino (JP); Kazutaka Hara, Musashino (JP); Shin Kaneko, Musashino (JP); Ryo Koma, Musashino (JP); Kazuaki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 256 days.

(21) Appl. No.: 18/285,625

(22) PCT Filed: Apr. 9, 2021

(86) PCT No.: PCT/JP2021/014999
§ 371 (c)(1),
(2) Date: Oct. 4, 2023

(87) PCT Pub. No.: WO2022/215244
PCT Pub. Date: Oct. 13, 2022

(65) Prior Publication Data
US 2025/0088777 A1 Mar. 13, 2025

(51) Int. Cl.
*H04J 14/02* (2006.01)
*H04Q 11/00* (2006.01)
(52) U.S. Cl.
CPC ...... *H04J 14/0307* (2023.08); *H04Q 11/0062* (2013.01); *H04Q 2011/0088* (2013.01)
(58) Field of Classification Search
CPC ............. H04J 14/0307; H04Q 11/0062; H04Q 2011/0088
See application file for complete search history.

(56) References Cited

U.S. PATENT DOCUMENTS 5,894,362 A    4/1999  Onaka et al.
6,335,810 B1   1/2002  Uehara
          (Continued)

FOREIGN PATENT DOCUMENTS

JP    H05130058 A    5/1993
JP    2001160820 A   6/2001
          (Continued)

OTHER PUBLICATIONS

Takuya Kanai et al., Photonic Gateway for All-Photonics Network, B-8-20, p. 141, Mar. 2021, IEICE.
          (Continued)

*Primary Examiner* — Kenneth N Vanderpuye
*Assistant Examiner* — Asif Shameem
(74) *Attorney, Agent, or Firm* — Harness, Dickey & Pierce, P.L.C.

(57)                ABSTRACT

Provided is an optical access system that performs communication using an optical signal on which management control signals used for management and control are superimposed in a plurality of transmission lines connecting a plurality of subscriber devices, the optical access system including: a plurality of splitters that are provided for the respective transmission lines and split a plurality of optical signals transmitted from the plurality of subscriber devices; a monitoring unit configured to acquire the management control signals from each of the plurality of optical signals split by each of the plurality of splitters; and an output device that is provided between the monitoring unit and the plurality of splitters and outputs the plurality of optical signals split by the plurality of splitters to the monitoring unit.

7 Claims, 11 Drawing Sheets

(56) References Cited

U.S. PATENT DOCUMENTS

| | | | |
|---|---|---|---|
| 6,891,995 B2 | 5/2005 | Ikushima et al. | |
| 8,886,036 B2 | 11/2014 | Jeong et al. | |
| 9,071,378 B2 | 6/2015 | Hoshida | |
| 9,553,665 B2 * | 1/2017 | Kim | H04B 10/073 |
| 10,797,799 B2 | 10/2020 | Nakagawa et al. | |
| 2002/0101635 A1 | 8/2002 | Taketomi | |
| 2006/0133806 A1 | 6/2006 | Krimmel | |
| 2008/0166119 A1 | 7/2008 | Ryu et al. | |
| 2008/0166122 A1 | 7/2008 | Hsiao | |
| 2010/0086304 A1 | 4/2010 | Mizutani et al. | |
| 2011/0116798 A1 | 5/2011 | Kai | |
| 2012/0148239 A1 | 6/2012 | Mori et al. | |
| 2015/0229389 A1 | 8/2015 | Kim et al. | |
| 2017/0155981 A1 | 6/2017 | Nakagawa et al. | |
| 2017/0279538 A1 | 9/2017 | Sone et al. | |
| 2018/0359024 A1 | 12/2018 | Oda et al. | |
| 2019/0058541 A1 | 2/2019 | Abe | |
| 2020/0136722 A1 | 4/2020 | Urban et al. | |
| 2021/0083778 A1 | 3/2021 | Honda et al. | |

FOREIGN PATENT DOCUMENTS

| | | | |
|---|---|---|---|
| JP | 2006-319894 A | 11/2006 | |
| JP | 2012124731 A | 6/2012 | |
| JP | 2014049775 A | 3/2014 | |
| JP | 2014165574 A | 9/2014 | |
| JP | 2016105548 A | 6/2016 | |
| WO | WO-2012154388 A1 | 11/2012 | |
| WO | WO-2017090611 A1 | 6/2017 | |
| WO | 2017/159519 A1 | 9/2017 | |
| WO | WO-2018/003095 A1 | 1/2018 | |
| WO | 2019/167797 A1 | 9/2019 | |

OTHER PUBLICATIONS

ITU-T G.989.2 Recommendation, "40-Gigabit-capable-passive optical networks 2(NG PON2): Physical media dependent (PMD) layer specification," Feb. 2019.

Y. Luo, et al., "Physical Layer Aspects of NG-PON2 Standards—Part 2: System Design and Technology Feasibility [Invited]" J.Opt. Commun. Netw., 8(1), pp. 43-52, Jan. 2016.

Masamichi Fujiwara, et al., "Increasing Splitting Ratio of 10Gb/s-Class PONs by Using FW-DMF that Acts as Low Loss Splitter for Upstream and Conventional Splitter for Downstream", OFC, Tu2C, 2014.

Nakagawa Goji et al: "Development of Evaluation Platform of AMCC Superimposition on CPRI Signal Transmission for Mobile Fronthaul Network", 2017.

* cited by examiner

OPTICAL ACCESS SYSTEM AND MONITORING METHOD

CROSS-REFERENCE TO RELATED APPLICATIONS

This application is a 371 U.S. National Phase of International Application No. PCT/JP2021/014999, filed on Apr. 9, 2021. The entire disclosure of the above application is incorporated herein by reference.

TECHNICAL FIELD

The present invention relates to an optical access system and a monitoring method.

BACKGROUND ART

In the International Telecommunication Union Telecommunication Standardization sector (ITU-T) G. 989.2 Recommendation, a passive optical network (PON) system that performs wavelength multiplexing called point to point wavelength division multiplexing-PON (PtP WDM-PON) is defined (see, for example, Non Patent Literature 1). In the PtP WDM-PON system, communication is performed using different wavelengths for each optical network unit (ONU) in an uplink direction that is a direction from an ONU to an optical line terminal (OLT) and in a downlink direction that is a direction from the OLT to the ONU.

As described in Non Patent Literature 1, in the PtP WDM-PON system, a management control signal called an auxiliary management and control channel (AMCC) is used as a signal for management and control used between the OLT and the ONU. The AMCC signal is a signal that is transmitted after being superimposed on a main signal after information to be transmitted is modulated by a predetermined method. The AMCC signal includes, for example, state information indicating a transmission/reception wavelength, transmission light intensity, temperature, and the like of an optical transceiver.

According to Non Patent Literature 1, there are two types of methods for superimposing the AMCC signals. A first method "baseband modulation" is a method of superimposing an AMCC signal on a main signal as a baseband signal on a transmitter (for example, ONU) side. In the superimposition method of "baseband modulation," the AMCC signal is separated by a filter such as a low-pass filter (LPF) on a receiver (for example, OLT) side.

A second method "low-frequency pilot tone" is a method of up-converting the AMCC signal to a certain carrier frequency and superimposing the AMCC signal on the main signal on the transmitter side. In the superimposition method of "low-frequency pilot tone," the AMCC signal is acquired by performing demodulation by signal processing or the like on the receiver side.

FIG. 8 illustrates a configuration of a PtP WDM system using a "baseband modulation" method. As illustrated in FIG. 8, a conventional PtP WDM system 100 includes a subscriber device 200 and a subscriber device 300. The subscriber device 200 is a device on the transmitting side, and the subscriber device 300 is a device on the receiving side.

The subscriber device 200 includes an optical transmission unit 210. The optical transmission unit 210 includes a laser diode (LD) 220 and a variable optical attenuator (VOA) 230. The subscriber device 200 converts an electrical signal of a main signal input from the outside into an optical signal of a main signal input from the outside into an optical signal by the LD 220. Thereafter, the optical transmission unit 210 superimposes an AMCC signal on the optical signal at the optical stage using the VOA 230 and outputs the superimposed signal to an optical fiber.

The subscriber device 300 includes an optical reception unit 310. The optical reception unit 310 includes a photo diode (PD) 320 and a low-pass filter (LPF) 330. The subscriber device 300 receives an optical signal transmitted through an optical fiber and converts the optical signal into an electrical signal by the PD 320. Thereafter, the subscriber device 300 separates an AMCC signal from a main signal by using the LPF 330, and acquires the AMCC signal. In the subscriber device 200, by placing the main signal and the AMCC signal at different frequencies, the main signal and the AMCC signal can be physically treated as separate signals.

FIG. 9 illustrates a configuration of another PtP WDM system. As illustrated in FIG. 9, a conventional PtP WDM system 100*a* includes a subscriber device 200, a subscriber device 300, a power splitter 350, a monitoring circuit 400, and a management control unit 450. In FIG. 9, in addition to the configuration illustrated in FIG. 8, a power splitter 350 is provided as a monitoring port in the middle of the optical fiber, and a monitoring circuit 400 capable of receiving the optical signal split by the power splitter 350 and extracting the AMCC signal is provided.

The monitoring circuit 400 includes a PD 410 and an LPF 420. The PD 410 and the LPF 420 perform processing similar to that of the PD 320 and the LPF 330 included in the optical reception unit. With such a configuration, the AMCC signal can be received without passing through the subscriber device 300. The AMCC signal received by the monitoring circuit 400 is input to the management control unit 450, and for example, a transmission/reception wavelength and the like of the optical transceiver are managed.

Although FIG. 9 illustrates the configuration in which an optical signal is transmitted from the subscriber device 200 and the optical signal is received by the subscriber device 300, a configuration of bidirectional communication can be employed by further including the optical reception unit 310 in the subscriber device 200 and further including the optical transmission unit 210 in the subscriber device 300.

In FIG. 10, a configuration of a WDM system 100*b* in which a plurality of subscriber device pairs perform communication using different wavelengths will be described. The WDM system 100*b* includes a plurality of subscriber devices 200-1 to 200-3, a plurality of subscriber devices 300-1 to 300-3, a plurality of power splitters 350-1 to 350-3, a plurality of monitoring circuits 400-1 to 400-3, a management control unit 450, optical SWs 500-1 and 500-2, and a plurality of optical multiplexers/demultiplexers 550-1 to 550-3, and 560-1 to 560-3.

In FIG. 10, in addition to the configuration illustrated in FIG. 9, a plurality of power splitters 350-1 to 350-3, a plurality of monitoring circuits 400-1 to 400-3, optical SWs 500-1 and 500-2, and a plurality of optical multiplexers/demultiplexers 550-1 to 550-3 and 560-1 to 560-3 are provided. The optical SWs 500-1 and 500-2 are provided between the subscriber devices-200-1 to 200-3 and the subscriber devices 300-1 to 300-3, and one optical transmission line can be selected from a plurality of optical transmission lines (in FIG. 10, three optical transmission lines). The optical multiplexers/demultiplexers 550-1 to 550-3 and 560-1 to 560-3 multiplex or demultiplex the optical signals output from the optical SWs 500-1 and 500-2. The power splitters 350-1 to 350-3 and the monitoring circuits 400b-1 to 400b-3 are provided in the middle of each optical transmission line.

The subscriber devices 200-1 to 200-3 transmit optical signals having wavelengths $\lambda 1$ to $\lambda 3$, and the subscriber devices 300-1 to 300-3 receive optical signals having wavelengths $\lambda 1$ to $\lambda 3$. In the optical SWs 500-1 and 500-2, a path between an input port and an output port is connected such that optical signals transmitted between the subscriber devices 200-1 to 200-3 and the subscriber devices 300-1 to 300-3 are output to designated optical transmission lines. The AMCC signal superimposed on the main signal by the subscriber devices 200-1 to 200-3 is acquired by the monitoring circuits 400b-1 to 400b-3.

FIG. 11 is a diagram illustrating a specific configuration of monitoring circuits 400b-1 to 400b-3. The monitoring circuit 400b includes a wavelength demultiplexer 430, a plurality of PDs 410-1 to 410-3, and a plurality of LPFs 420-1 to 420-3. Here, it is assumed that the PD 410-1 receives an optical signal output from a port corresponding to a wavelength $\lambda 1$, the PD 410-2 receives an optical signal output from a port corresponding to a wavelength $\lambda 2$, and the PD 410-3 receives an optical signal output from a port corresponding to a wavelength $\lambda 3$. The wavelength demultiplexer 430 demultiplexes the input optical signal for each wavelength and outputs the optical signal from the corresponding port for each wavelength. The PDs 410-1 to 410-3 convert optical signals output from the wavelength demultiplexer 430 into electrical signals. The LPFs 420-1 to 420-3 separate AMCC signals from electrical signals. Thereby, the AMCC signal superimposed on the optical signal having each wavelength can be acquired.

CITATION LIST

Non Patent Literature

Non Patent Literature 1: "ITU-T G.989.2 Recommendation, "40-Gigabit-capable-passive optical networks (NG-PON2): Physical media dependent (PMD) layer specification," February 2019.

SUMMARY OF INVENTION

Technical Problem

In an optical access system in which signals having a plurality of wavelengths communicate through a plurality of optical transmission lines, when all AMCC signals are to be monitored, as illustrated in FIG. 10, the same number of monitoring circuits 400b as the optical transmission lines are required. Furthermore, as illustrated in FIG. 11, each monitoring circuit 400b requires as many sets of PDs 410 and LPFs 420 as the number of wavelengths. Therefore, the number of sets of the PDs 410 and the LPFs 420 is required to be the same as the number of optical transmission lines×the number of wavelengths, and the number of sets of the PDs 410 and the LPFs 420 is required to be larger than the number of subscriber device pairs performing communication. Therefore, in an optical access system that communicates through a plurality of optical transmission lines, a method of monitoring a large number of AMCC signals with a smaller configuration is desired.

In view of the above circumstances, an object of the present invention is to provide a technique capable of monitoring a large number of management control signals with a smaller configuration in an optical access system that communicates through a plurality of optical transmission lines.

Solution to Problem

One aspect of the present invention is an optical access system that performs communication using an optical signal on which management control signals used for management and control are superimposed in a plurality of transmission lines connecting a plurality of subscriber devices, the optical access system including: a plurality of splitters that are provided for the respective transmission lines and split a plurality of optical signals transmitted from the plurality of subscriber devices; a monitoring unit configured to acquire the management control signals from each of the plurality of optical signals split by each of the plurality of splitters; and an output device that is provided between the monitoring unit and the plurality of splitters and outputs the plurality of optical signals split by the plurality of splitters to the monitoring unit.

One aspect of the present invention is a monitoring method in an optical access system that performs communication using an optical signal on which management control signals used for management and control are superimposed in a plurality of transmission lines connecting a plurality of subscriber devices, the monitoring method including: splitting, when provided for the respective transmission lines, a plurality of optical signals transmitted from the plurality of subscriber devices; and outputting, when provided between a monitoring unit and the plurality of splitters, the plurality of optical signals split by the plurality of splitters to the monitoring unit, the monitoring unit acquiring the management control signals from each of the plurality of split optical signals.

Advantageous Effects of Invention

According to the present invention, it is possible to monitor a large number of management control signals with a smaller configuration in an optical access system that communicates through a plurality of optical transmission lines.

DESCRIPTION OF EMBODIMENTS

Hereinafter, an embodiment of the present invention will be described in detail with reference to the drawings.

First Embodiment

Figure 1:
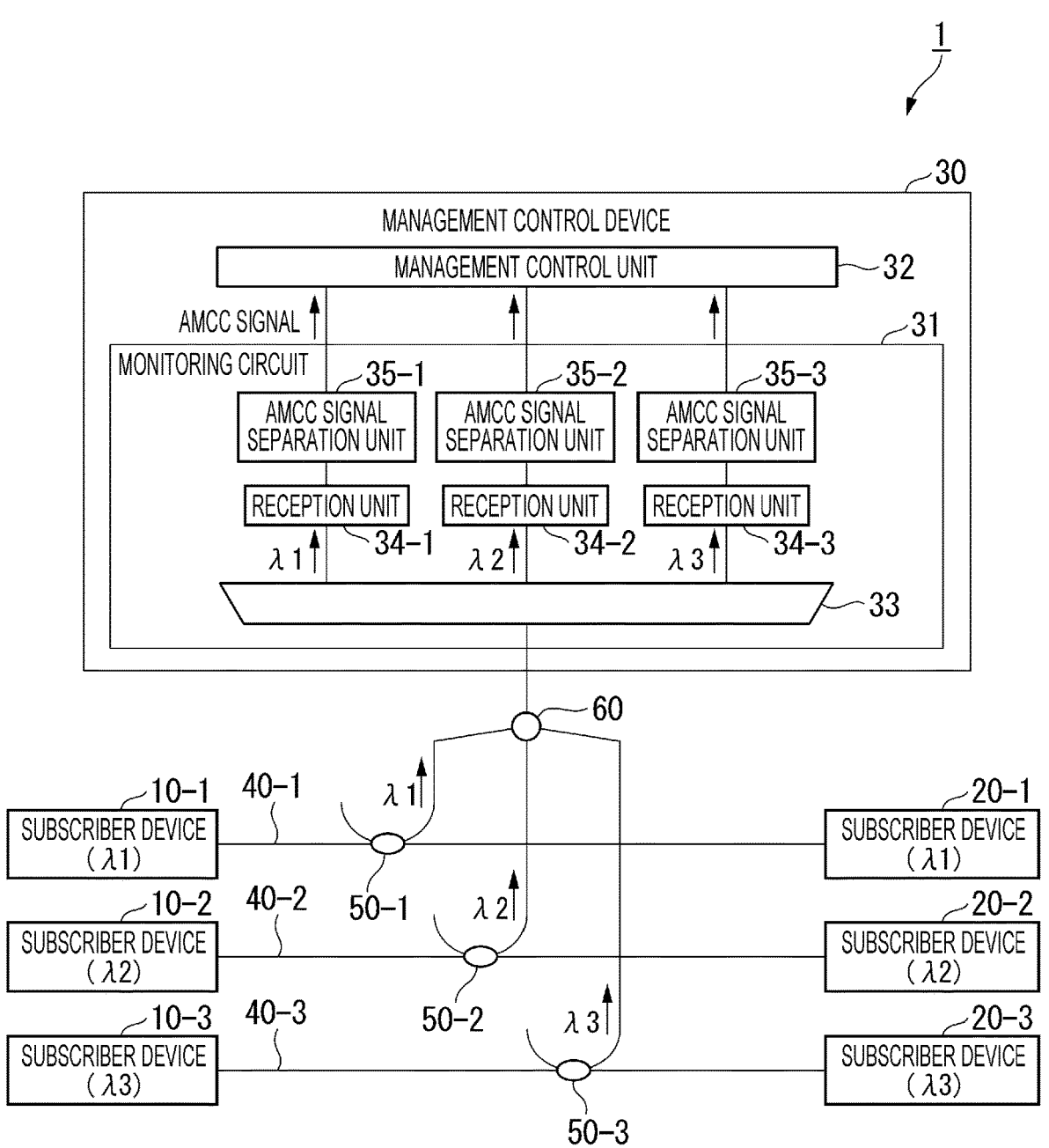
FIG. 1 is a diagram illustrating a configuration example of an optical access system according to a first embodiment.

FIG. 1 is a diagram illustrating a configuration example of an optical access system 1 according to a first embodiment. The optical access system 1 includes a plurality of subscriber devices 10-1 to 10-3, a plurality of subscriber devices 20-1 to 20-3, a management control device 30, a plurality of power splitters 50-1 to 50-3, and an optical coupler 60.

In FIG. 1, the subscriber device 10-1 and the subscriber device 20-1 are connected via an optical transmission line 40-1. The subscriber device 10-2 and the subscriber device 20-2 are connected via an optical transmission line 40-2. The subscriber device 10-3 and the subscriber device 20-3 are connected via an optical transmission line 40-3. The optical transmission line 40 is, for example, an optical fiber.

In the following description, except for exceptions, a case where the number of the subscriber devices 10 and 20 is three will be described as an example, but the number of the subscriber devices 10 and 20 may be two or more. A power splitter 50-$n$ is provided in an optical transmission line 40-$n$ ($n$ is an integer of 1 or more). That is, the power splitter 50-$n$ is provided for each optical transmission line 40-$n$.

A subscriber device 10-$n$ transmits an optical signal having a wavelength λ$n$ to the optical transmission line 40-$n$. For example, the subscriber device 10-$n$ transmits, to the optical transmission line 40-$n$, an optical signal having a wavelength λ$n$ obtained by superimposing an AMCC signal on the main signal. That is, the subscriber device 10-$n$ transmits optical signals having different wavelengths to the optical transmission line 40-$n$.

In the following description, it is assumed that the subscriber device 10-1 transmits an optical signal having a wavelength λ1 obtained by superimposing an AMCC signal on the main signal to the optical transmission line 40-1, the subscriber device 10-2 transmits an optical signal having a wavelength λ2 obtained by superimposing an AMCC signal on the main signal to the optical transmission line 40-2, and the subscriber device 10-3 transmits an optical signal having a wavelength λ3 obtained by superimposing an AMCC signal on the main signal to the optical transmission line 40-3. Note that the frequency of the AMCC signal superimposed on the main signal is the same between the subscriber devices 10-$n$.

Figure 9:
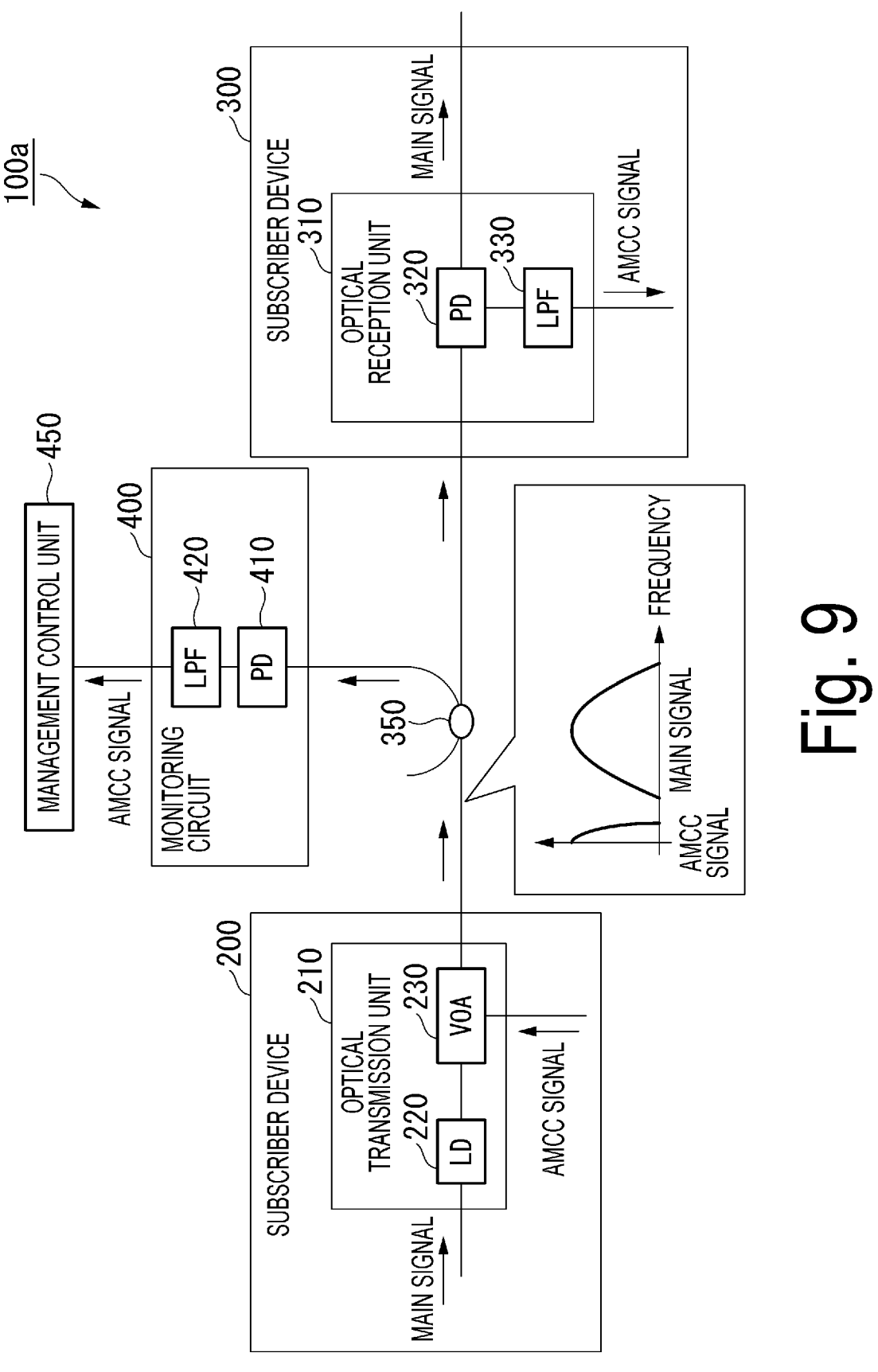
FIG. 9 is a diagram illustrating a configuration of another PtP WDM system.
Figure 10:
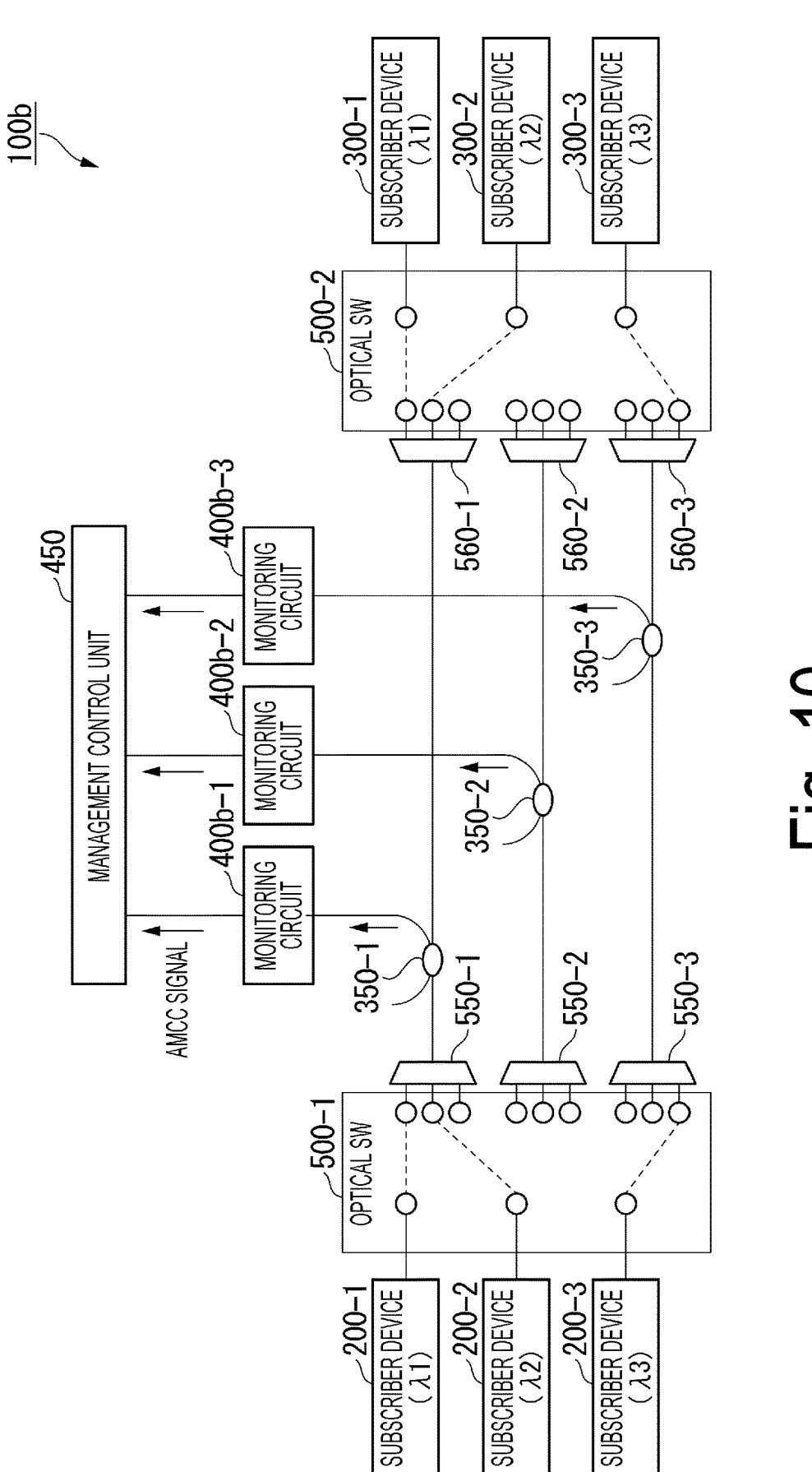
FIG. 10 is a diagram for describing a configuration of a WDM-PON system in which a plurality of subscriber device pairs perform communication using different wavelengths.

The method for superimposing the AMCC signal may be either "baseband modulation" or "low-frequency pilot tone." The configuration of the subscriber device 10-$n$ varies depending on the manner of superimposing the AMCC signal, but in the following description, it is assumed that the subscriber device 10-$n$ superimposes the AMCC signal on the main signal by the "baseband modulation" method. In this case, the subscriber device 10-$n$ has a configuration similar to that of the subscriber device 200 in FIG. 9.

A subscriber device 20-$n$ receives an optical signal transmitted from the subscriber device 10-$n$. For example, the subscriber device 20-$n$ receives an optical signal having a wavelength λ$n$ in which the AMCC signal is superimposed on the main signal via the optical transmission line 40-$n$. The subscriber device 20-$n$ has a configuration capable of separating the superimposed AMCC signals by the superimposition method of the subscriber device 10-$n$. Therefore, when the subscriber device 10-$n$ superimposes the AMCC signal on the main signal by the "baseband modulation" method, the subscriber device 20-$n$ has a configuration similar to that of the subscriber device 300 in FIG. 9.

Figure 11:
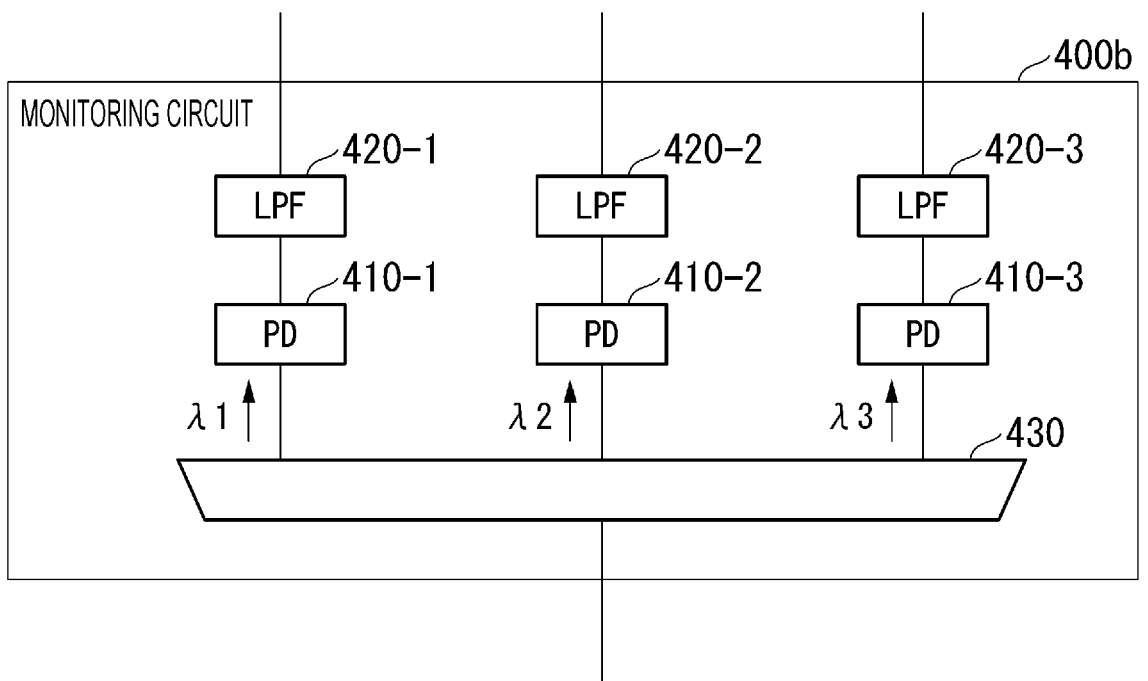
FIG. 11 is a diagram illustrating a specific configuration of a conventional monitoring circuit.

The management control device 30 monitors the AMCC signal and performs control based on the AMCC signal. The management control device 30 includes a monitoring circuit (monitor) 31 and a management control unit 32. The monitoring circuit 31 includes a wavelength demultiplexer 33, a plurality of reception units (a plurality of receivers) 34-1 to 34-3, and a plurality of AMCC signal separation units (a plurality of management control signal separator) 35-1 to 35-3. The number of reception units 34 and the number of AMCC signal separation units 35 are the same as the number of wavelengths. The monitoring circuit 31 has a configuration similar to that of the monitoring circuit 400$b$ illustrated in FIG. 11.

The wavelength demultiplexer 33 demultiplexes the input optical signal for each wavelength and outputs the optical signal from the corresponding port for each wavelength. In the example illustrated in FIG. 1, the wavelength demultiplexer 33 has a configuration including one input port and three output ports, but the wavelength demultiplexer 33 may have output ports corresponding to the number of wavelengths used in the subscriber device 10. The reception unit 34-1 is connected to an output port of the wavelength demultiplexer 33 that outputs an optical signal having a wavelength λ1, the reception unit 34-2 is connected to an output port that outputs an optical signal having a wavelength λ2, and the reception unit 34-3 is connected to an output port that outputs an optical signal having a wavelength λ3.

A reception unit 34-$n$ converts an optical signal having a wavelength λ$n$ output from the wavelength demultiplexer 33 into an electrical signal. For example, the reception unit 34-1 converts an optical signal having a wavelength λ1 output from the wavelength demultiplexer 33 into an electrical signal. The reception unit 34-$n$ is configured using a PD.

An AMCC signal separation unit 35-$n$ separates an AMCC signal from the electrical signal converted by the reception unit 34-$n$. For example, the AMCC signal separation unit 35-1 separates an AMCC signal from the electrical signal converted by the reception unit 34-1. The AMCC signal separation unit 35-$n$ is configured using LPF.

The management control unit 32 receives the AMCC signal separated by the AMCC signal separation unit 35-$n$, and manages transmission/reception wavelengths and the like of the subscriber devices 10-$n$ and 20-$n$ on the basis of the received AMCC signal.

In the first embodiment, the present invention can be applied to a case where at least the number of output ports of the wavelength demultiplexer 33 and the number of communicating subscriber devices 10 and 20 are the same.

The power splitter 50-$n$ splits an optical signal transmitted through the optical transmission line 40-$n$ into a first path toward the optical coupler 60 and a second path toward the subscriber device 20-$n$. The optical signal having the wavelength λ$n$ split by the power splitter 50-$n$ is input to the optical coupler 60 and the subscriber device 20-$n$.

The optical coupler 60 is a terminal with $n$ inputs and one output. The optical coupler 60 receives the optical signal split by the power splitter 50-$n$ and outputs the optical signal to the management control device 30 via an optical fiber. In the example illustrated in FIG. 1, a plurality of optical signals split by the power splitters 50-1 to 50-3 are input to optical coupler 60. The optical coupler 60 multiplexes the input optical signals and outputs the multiplexed optical signals to the management control device 30. The optical coupler 60 is one aspect of an output device.

Figure 2:
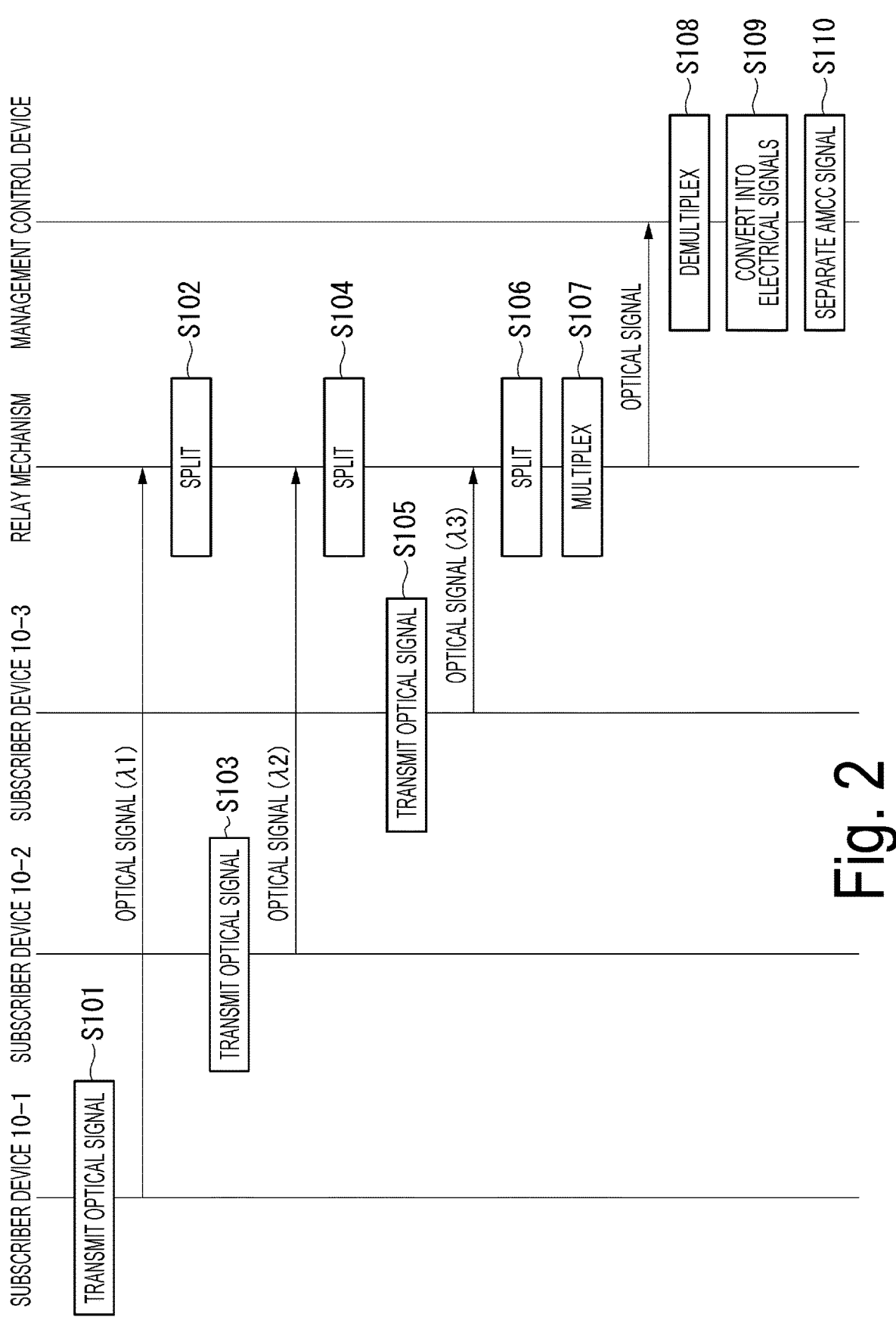
FIG. 2 is a sequence diagram illustrating a flow of processing of the optical access system according to the first embodiment.

FIG. 2 is a sequence diagram illustrating a flow of processing of the optical access system 1 according to the first embodiment. In FIG. 2, the power splitters 50-1 to 50-3 and the optical coupler 60 will be described as relay mechanisms.

The subscriber device 10-1 transmits an optical signal having a wavelength λ1 to the optical transmission line 40-1 (step S101). The optical signal transmitted from the subscriber device 10-1 is input to the power splitter 50-1 via the optical transmission line 40-1. The power splitter 50-1 splits the input optical signal having the wavelength λ1 into a first path and a second path (step S102). Accordingly, the optical signal having the wavelength λ1 is input to the optical coupler 60.

The subscriber device 10-2 transmits an optical signal having a wavelength λ2 to the optical transmission line 40-2 (step S103). The optical signal transmitted from the subscriber device 10-2 is input to the power splitter 50-2 via the optical transmission line 40-2. The power splitter 50-2 splits the input optical signal having the wavelength λ2 into a first path and a second path (step S104). Accordingly, the optical signal having the wavelength λ2 is input to the optical coupler 60.

The subscriber device 10-3 transmits an optical signal having a wavelength λ3 to the optical transmission line 40-3 (step S105). The optical signal transmitted from the subscriber device 10-3 is input to the power splitter 50-3 via the optical transmission line 40-3. The power splitter 50-3 splits the input optical signal having the wavelength λ3 into a first path and a second path (step S106). Accordingly, the optical signal having the wavelength λ3 is input to the optical coupler 60.

In FIG. 2, the processing in steps S101, S103, and S105 may be performed at the same timing or may be performed at different timings. In the case of the same timing, a plurality of optical signals are input to the optical coupler 60. Here, it is assumed that a plurality of optical signals are input to the optical coupler 60. The optical coupler 60 multiplexes the plurality of input optical signals and outputs the multiplexed optical signals to the management control device 30 (step S107).

The monitoring circuit 31 of the management control device 30 demultiplexes the input optical signals by the wavelength demultiplexer 33 (step S108). The optical signal having the wavelength λ1 demultiplexed by the wavelength demultiplexer 33 is input to the reception unit 34-1. The optical signal having the wavelength λ2 demultiplexed by the wavelength demultiplexer 33 is input to the reception unit 34-2. The optical signal having the wavelength λ3 demultiplexed by the wavelength demultiplexer 33 is input to the reception unit 34-3.

The respective reception units 34-1 to 34-3 convert the optical signals having the wavelengths λ1 to λ3 output from the wavelength demultiplexer 33 into electrical signals (step S109). The respective reception units 34-1 to 34-3 output the converted electrical signals to the AMCC signal separation units 35-1 to 35-3. The AMCC signal separation units 35-1 to 35-3 separate the AMCC signals from the input electrical signals (step S110).

According to the optical access system 1 configured as described above, the power splitter 50-n for splitting the optical signal is provided in each of the plurality of optical transmission lines 40-n, and the optical signal split by each power splitter 50-n is multiplexed by the optical coupler 60. In this way, the optical signals having the plurality of different wavelengths are coupled to one optical fiber using the optical coupler 60 provided between the power splitter 50-n provided in each of the plurality of optical transmission lines 40-n and the monitoring circuit 31, and then the optical signals are input to the monitoring circuit 31. The optical signal input to the monitoring circuit 31 is demultiplexed for each wavelength by the wavelength demultiplexer 33 and input to each reception unit 34-n. Each reception unit 34-n converts an optical signal into an electrical signal. Each AMCC signal separation unit 35-n separates an AMCC signal from the electrical signal. In this way, since the optical signals having different wavelengths transmitted through the different optical transmission lines 40-n can be multiplexed by the optical coupler 60 and input to a monitoring circuit, it is not necessary to provide a monitoring circuit for each optical transmission line as in the related art. Accordingly, the number of monitoring circuits 31 can be reduced. That is, the number of LPFs and PDs can be reduced. Therefore, in the optical access system that communicates through the plurality of optical transmission lines, it is possible to monitor a large number of control signals with a smaller configuration.

Second Embodiment

In a second embodiment, a configuration in which a plurality of optical SWs and a plurality of optical multiplexers/demultiplexers are provided between opposing subscriber devices in addition to the configuration of the first embodiment, and optical signals having different wavelengths are transmitted through one optical transmission line will be described.

Figure 3:
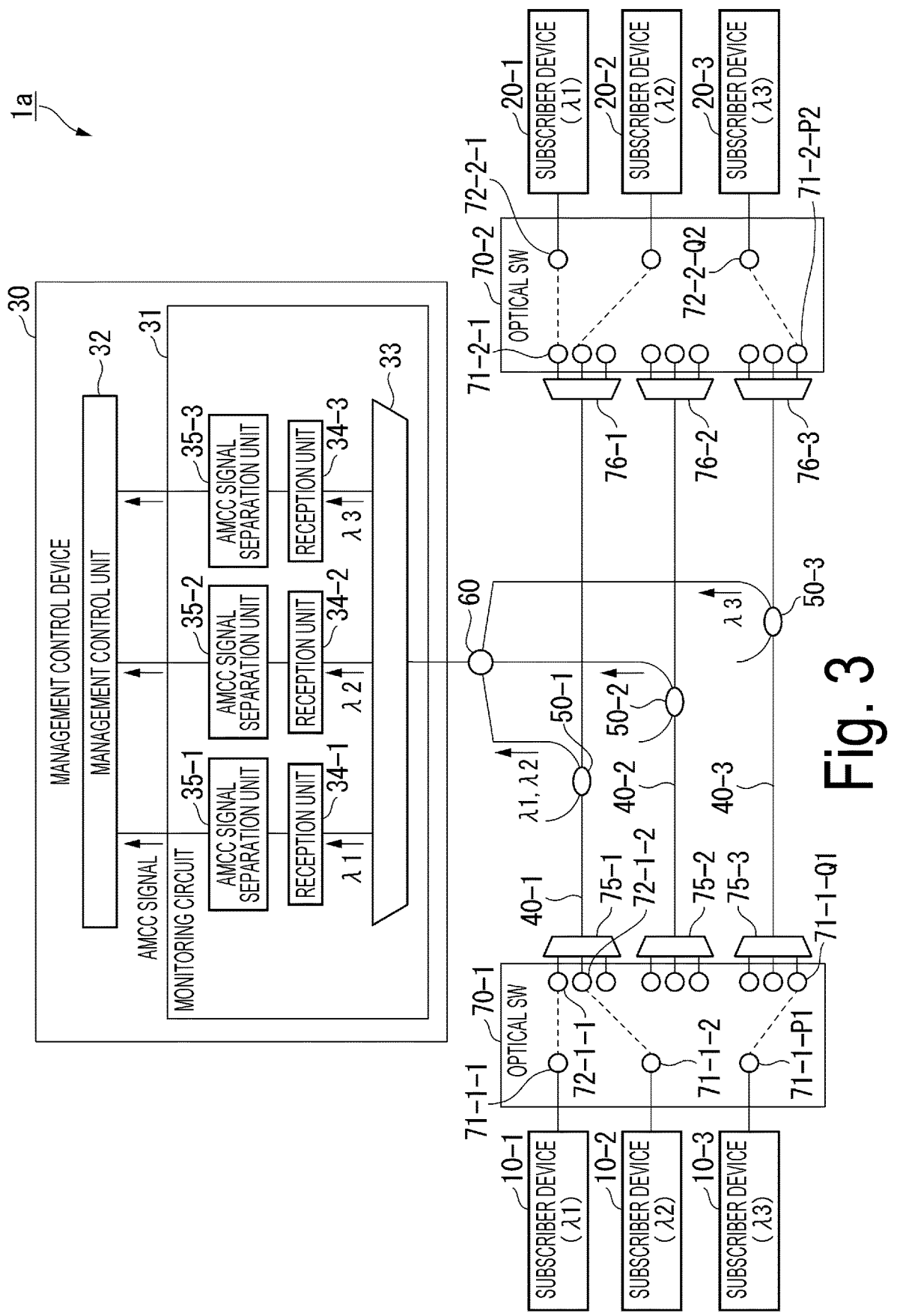
FIG. 3 is a diagram illustrating a configuration example of an optical access system according to a second embodiment.

FIG. 3 is a diagram illustrating a configuration example of an optical access system 1a according to the second embodiment. The optical access system 1a includes a plurality of subscriber devices 10-1 to 10-3, a plurality of subscriber devices 20-1 to 20-3, a management control device 30, a plurality of power splitters 50-1 to 50-3, an optical coupler 60, a plurality of optical SWs 70-1 and 70-2, and a plurality of optical multiplexers/demultiplexers 75-1 to 75-3 and 76-1 to 76-3. The optical multiplexers/demultiplexers 75-1 to 75-3 and 76-1 to 76-3 may be, for example, 1×N arrayed waveguide gratings (AWG), and output optical signals input with different wavelengths from a single port or output optical signals having different wavelengths input from a single port from ports corresponding to the wavelengths of the optical signals, respectively.

The optical access system 1a has a configuration different from that of the optical access system 1 in that optical SWs 70-1 and 70-2 and optical multiplexers/demultiplexers 75-1 to 75-3 and 76-1 to 76-3 are further provided. Other configurations of the optical access system 1a are similar to those of the optical access system 1. Therefore, differences from the optical access system 1 will be mainly described below.

The optical SW 70-1 includes ports 71-1-1 to 71-1-P1 (where P1 is an integer of 2 or more) and ports 72-1-1 to 72-1-Q1 (where Q1 is an integer of 2 or more). When any of the ports 71-1-1 to 71-1-P1 is not specified, or collectively referred to as a port 71-1. When any of the ports 72-1-1 to 72-1-Q1 is not specified, or collectively referred to as a port 72-1. The optical SW 70-1 is one aspect of a first optical switch.

The plurality of subscriber devices 10-1 to 10-3 are connected to the port 71-1 of the optical SW 70-1 via optical transmission lines, and the plurality of optical multiplexers/demultiplexers 75-1 to 75-3 are connected to the port 72-1 of the optical SW 70-1 via optical transmission lines. An optical signal input to a certain port of the optical SW 70-1 is output from another port.

The optical SW 70-2 includes ports 71-2-1 to 71-2-P2 (where P2 is an integer of 2 or more) and ports 72-2-1 to 72-2-Q2 (where Q2 is an integer of 2 or more). When any of the ports 71-2-1 to 71-2-P2 is not specified, or collectively referred to as a port 71-2. When any of the ports 72-2-1 to 72-2-Q2 is not specified, or collectively referred to as a port 72-2.

The plurality of optical multiplexers/demultiplexers 76-1 to 76-3 are connected to the port 71-2 of the optical SW 70-2 via optical transmission lines, and the plurality of subscriber devices 20-1 to 20-3 are connected to the port 72-2 of the optical SW 70-2 via optical transmission lines. An optical signal input to a certain port of the optical SW 70-2 is output from another port.

Optical multiplexers/demultiplexers 75-$n$ and 76-$n$ multiplex or demultiplex the input optical signals. The optical multiplexer/demultiplexer 75-$n$ is provided between the optical SW 70-1 and the optical transmission line 40-$n$. The optical multiplexer/demultiplexer 76-$n$ is provided between the optical SW 70-2 and the optical transmission line 40-$n$. The optical multiplexers/demultiplexers 75-$n$ and 76-$n$ are provided for respective optical transmission lines 40, for example.

In the optical multiplexer/demultiplexer 75-$n$, a plurality of ports (in FIG. 3, there are three ports, ports to which optical signals having wavelengths $\lambda 1$, $\lambda 2$, and $\lambda 3$ are input from above) corresponding to the number of wavelengths used by the subscriber device 10 are connected to the port 72-1 of the optical SW 70-1. In the optical multiplexer/demultiplexer 76-$n$, a plurality of ports (in FIG. 3, there are three ports, ports to which optical signals having wavelengths $\lambda 1$, $\lambda 2$, and $\lambda 3$ are input from above) corresponding to the number of wavelengths used by the subscriber device 20 are connected to the port 71-2 of the optical SW 70-2.

Next, a flow of processing of the optical access system 1$a$ according to the second embodiment will be described.

The respective subscriber devices 10-1 to 10-3 transmit optical signals having different wavelengths. Optical signals having different wavelengths transmitted from the respective subscriber devices 10-1 to 10-3 are input to the optical SW 70-1. For example, an optical signal having a wavelength $\lambda 1$ transmitted from the subscriber device 10-1 is input to the port 71-1-1 of the optical SW 70-1. Similarly, an optical signal having a wavelength $\lambda 2$ transmitted from the subscriber device 10-2 is input to the port 71-1-2 of the optical SW 70-1. Similarly, an optical signal having a wavelength $\lambda 3$ transmitted from the subscriber device 10-3 is input to the port 71-1-P1 (for example, P1 is 3) of the optical SW 70-1.

It is assumed that a connection relationship between the port 71 and the port 72 in the optical SW 70-1 is set in advance. In FIG. 3, the port 71-1-1 and the port 72-1-1 are connected, the port 71-1-2 and the port 72-1-2 are connected, and the port 71-1-P1 and the port 72-1-Q1 (for example, Q1 is 9) are connected. Therefore, the optical signal having the wavelength $\lambda 1$ input to the port 71-1-1 is output from the port 72-1-1, the optical signal having the wavelength $\lambda 2$ input to the port 71-1-2 is output from the port 72-1-2, and the optical signal having the wavelength $\lambda 3$ input to the port 71-1-P1 is output from the port 72-1-Q1.

The optical multiplexer/demultiplexer 75-1 is connected to the ports 72-1-1 and 72-1-2. Therefore, the optical multiplexer/demultiplexer 75-1 multiplexes the optical signal having the wavelength $\lambda 1$ output from the port 72-1-1 and the optical signal having the wavelength $\lambda 2$ output from the port 72-1-2, and outputs the multiplexed optical signals to the optical transmission line 40-1. The optical multiplexer/demultiplexer 75-3 is connected to the port 72-1-Q1. Therefore, the optical multiplexer/demultiplexer 75-3 outputs the optical signal having the wavelength $\lambda 3$ output from the port 72-1-Q1 to the optical transmission line 40-3.

The optical signal output from the optical multiplexer/demultiplexer 75-1 is input to the power splitter 50-1 via the optical transmission line 40-1. The power splitter 50-1 splits the input optical signals having the wavelengths $\lambda 1$ and $\lambda 2$ into a first path and a second path. Accordingly, the optical signals having the wavelengths $\lambda 1$ and $\lambda 2$ are input to the optical coupler 60.

The optical signal output from the optical multiplexer/demultiplexer 75-3 is input to the power splitter 50-3 via the optical transmission line 40-3. The power splitter 50-3 splits the input optical signal having the wavelength $\lambda 3$ into a first path and a second path. Accordingly, the optical signal having the wavelength $\lambda 3$ is input to the optical coupler 60. The optical coupler 60 multiplexes the plurality of input optical signals and outputs the multiplexed optical signals to the management control device 30. Since the processing performed by the management control device 30 is similar to that of the first embodiment, the description thereof will be omitted.

The optical signal split into the second path by the power splitter 50-1 is input to the optical multiplexer/demultiplexer 76-1. The optical multiplexer/demultiplexer 76-1 demultiplexes the input optical signal. The optical signal demultiplexed by the optical multiplexer/demultiplexer 76-1 is input to the port 71-2 of the optical SW 70-2. The optical signal input to the port 71-2 of the optical SW 70-2 is output from the port 72-2 connected to the port 71-2 and transferred to the subscriber device 20.

The optical signal split into the second path by the power splitter 50-3 is input to the optical multiplexer/demultiplexer 76-3. The optical multiplexer/demultiplexer 76-3 demultiplexes the input optical signal. The optical signal demultiplexed by the optical multiplexer/demultiplexer 76-3 is input to the port 71-2 of the optical SW 70-2. The optical signal input to the port 71-2 of the optical SW 70-2 is output from the port 72-2 connected to the port 71-2 and transferred to the subscriber device 20.

According to the optical access system 1$a$ configured as described above, effects similar to those of the first embodiment can be obtained.

Further, in the optical access system 1$a$, the optical SWs 70-1 and 70-2 are provided in the optical transmission line 40 connecting the subscriber device 10 and the subscriber device 20. Accordingly, the optical signal transmitted from the subscriber device 10 can be transmitted by switching the path. Even in a case where the path is switched by the optical SW 70-1 and optical signals having different wavelengths are transmitted through the same optical transmission line 40, the optical signals having different wavelengths can be multiplexed by the optical coupler 60 and input to a monitoring circuit. Therefore, it is not necessary to provide a monitoring circuit for each optical transmission line as in the related art. Accordingly, the number of monitoring circuits 31 can be reduced. That is, the number of LPFs and PDs can be reduced. Therefore, in the optical access system that communicates through the plurality of optical transmission lines, it is possible to monitor a large number of control signals with a smaller configuration.

Third Embodiment

In a third embodiment, a configuration will be described in which an optical SW is provided between a power splitter and a monitoring circuit, and optical signals having different wavelengths are output from different output destinations by the optical SW to input the optical signals to the monitoring circuit.

Figure 4:
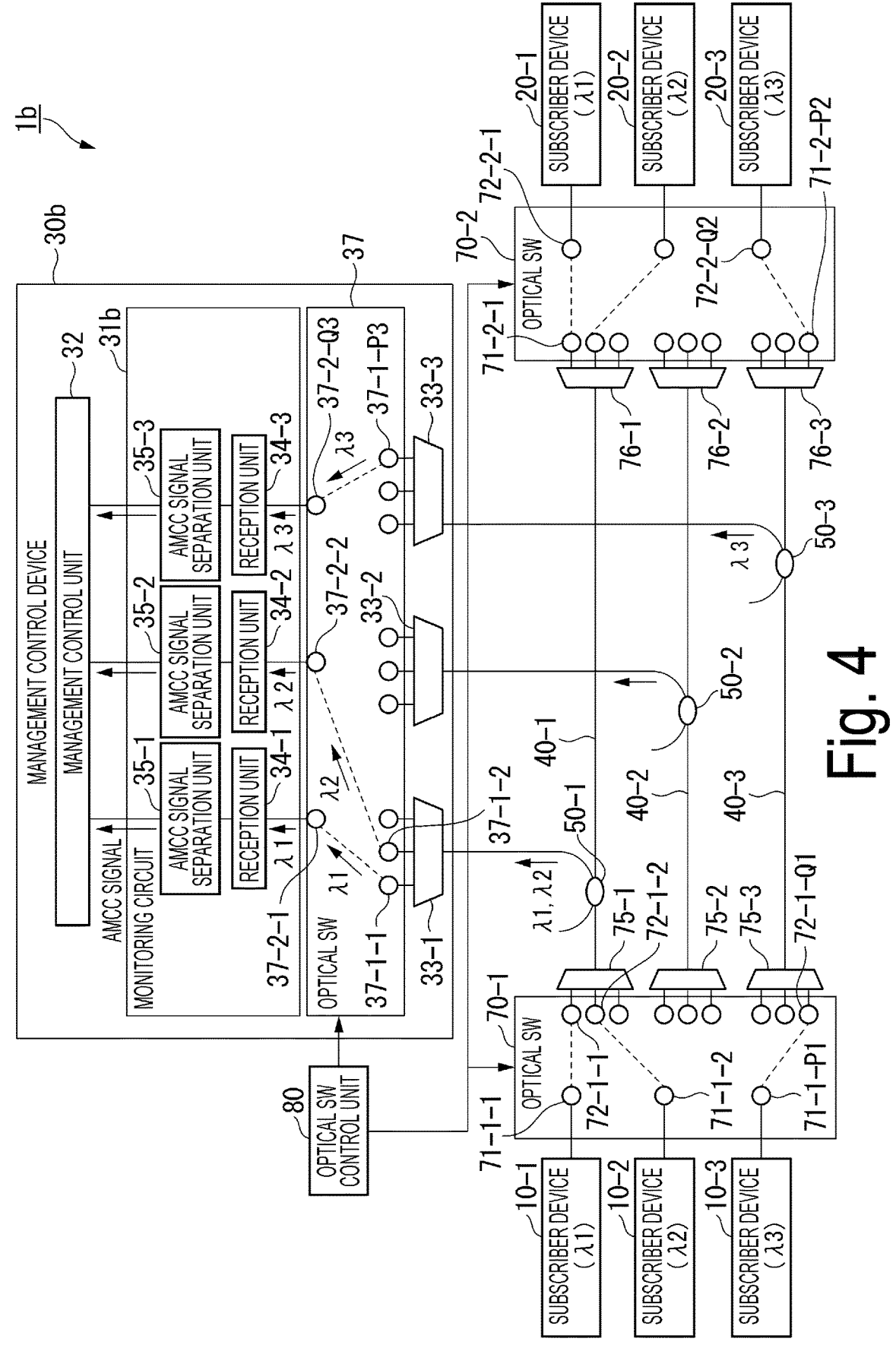
FIG. 4 is a diagram illustrating a configuration example of an optical access system according to a third embodiment.

FIG. 4 is a diagram illustrating a configuration example of an optical access system 1b according to the third embodiment. The optical access system 1b includes a plurality of subscriber devices 10-1 to 10-3, a plurality of subscriber devices 20-1 to 20-3, a management control device 30b, a plurality of power splitters 50-1 to 50-3, a plurality of optical SWs 70-1 and 70-2, a plurality of optical multiplexers/demultiplexers 75-1 to 75-3 and 76-1 to 76-3, and an optical SW control unit 80.

The optical access system 1b has a configuration different from that of the optical access system 1a in that the optical access system 1b does not include the optical coupler 60, includes the management control device 30b instead of the management control device 30, and newly includes the optical SW control unit 80. Other configurations of the optical access system 1b are similar to those of the optical access system 1a. Therefore, differences from the optical access system 1b will be mainly described below.

Unlike the first and second embodiments, the optical access system 1b does not include the optical coupler 60. Therefore, the optical signal transmitted through each optical transmission line 40 is split by each of the power splitters 50-1 to 50-3 and input to the management control device 30b.

The management control device 30b monitors the AMCC signal and performs control based on the AMCC signal. The management control device 30b includes a monitoring circuit 31b, a management control unit 32, a plurality of wavelength demultiplexers 33-1 to 33-3, and an optical SW 37. The monitoring circuit 31b includes a plurality of reception units 34-1 to 34-3, and a plurality of AMCC signal separation units 35-1 to 35-3. The monitoring circuit 31b has a configuration different from that of the monitoring circuit 31 in that the wavelength demultiplexer 33 is not provided, but other configurations are similar to those of the monitoring circuit 31.

The wavelength demultiplexers 33-1 to 33-3 are provided between the power splitters 50-1 to 50-3 and the optical SW 37. The wavelength demultiplexers 33-1 to 33-3 demultiplex the optical signals output from the power splitters 50-1 to 50-3 for each wavelength and output the optical signals from the corresponding ports for each wavelength. Each of the wavelength demultiplexers 33-1 to 33-3 is connected to one of the power splitters 50-1 to 50-3. In the example illustrated in FIG. 4, each of the wavelength demultiplexers 33-1 to 33-3 has one input port and three output ports, and the three output ports are connected to the optical SW 37.

The optical SW 37 includes ports 37-1-1 to 37-1-P3 (where P3 is an integer of 2 or more) and ports 37-2-1 to 37-2-Q3 (where Q3 is an integer of 2 or more). When any of the ports 37-1-1 to 37-1-P3 is not specified, or collectively referred to as a port 37-1. When any of the ports 37-2-1 to 37-2-Q3 is not specified, or collectively referred to as a port 37-2. The optical SW 37 is one aspect of a second optical switch.

The wavelength demultiplexers 33-1 to 33-3 are connected to the port 37-1 of the optical SW 37 via optical transmission lines, and the monitoring circuit 31b is connected to the port 37-2 of the optical SW 37 via an optical transmission line. For example, the reception units 34-1 to 34-3 of the monitoring circuit 31b are connected to the port 37-2 of the optical SW 37. The connection between the port 37-1 and the port 37-2 is controlled by the optical SW control unit 80 such that optical signals having different wavelengths input to the port 37-1 of the optical SW 37 are output from different ports 37-2. By outputting from different ports for each wavelength in this way, the reception unit 34 of the connection destination can perform reception processing according to the wavelength. An optical signal input to a certain port of the optical SW 37 is output from another port.

The optical SW control unit 80 controls each of the optical SWs 70-1, 70-2, and 37. The optical SW control unit 80 holds optical transmission line information and optical signal wavelength information. The optical transmission line information is information on an optical transmission line through which an optical signal transmitted and received between the subscriber device 10 and the subscriber device 20 passes. The optical transmission line information includes at least information for identifying an optical transmission line through which an optical signal transmitted and received between the subscriber device 10 and the subscriber device 20 passes, for example. The optical signal wavelength information includes information on the wavelength used by the subscriber device 10 and the subscriber device 20.

Since the optical SW control unit 80 holds the optical transmission line information and the optical signal wavelength information, the optical SW control unit 80 can ascertain which optical transmission line should transmit the optical signal of which wavelength. The optical SW control unit 80 controls a connection relationship between input ports and output ports of the optical SWs 70-1, 70-2, and 37 by using the optical transmission line information and the optical signal wavelength information. The optical SW control unit 80 designates an optical transmission line through which an optical signal transmitted between the subscriber device 10 and the subscriber device 20 passes by controlling a connection relationship between input ports and output ports of the optical SWs 70-1 and 70-2.

For example, in a case where the optical transmission line information includes transmission of the optical signal transmitted by the subscriber devices 10-1 and 10-2 through the optical transmission line 40-1, and the optical signal wavelength information includes use of the wavelengths λ1 and λ2 by the subscriber devices 10-1 and 10-2, the optical SW control unit 80 controls the optical SW 70-1 such that the port 71-1-1 and the port 72-1-1 of the optical SW 70-1 are connected, and the port 71-1-2 and the port 72-1-2 of the optical SW 70-1 are connected. Accordingly, optical signals transmitted from the subscriber devices 10-1 and 10-2 are transmitted through the optical transmission line 40-1.

Furthermore, the optical SW control unit 80 inputs the optical signals output from the wavelength demultiplexers 33-1 to 33-3 to the reception unit 34 of the monitoring circuit 31b by designating the connection relationship between the input port and the output port of the optical SW 37. That is, the optical SW control unit 80 controls the optical SW 37 such that the optical signal input to the port 37-1 of the optical SW 37 is output from the port 37-2 corresponding to the transfer destination. In this way, by designating the connection relationship between the input port and the output port in the optical SW 37, only the port to which the optical signal is input can be selected and connected to the output port connected to the monitoring circuit 31b.

The optical SW control unit 80 performs control such that the optical signal having the wavelength λ1 input to the port 37-1-1 of the optical SW 37 is output from the port 37-2-1 to which the reception unit 34-1 is connected, and performs control such that the optical signal having the wavelength λ2 input to the port 37-1-2 of the optical SW 37 is output from the port 37-2-2 to which the reception unit 34-2 is connected. Specifically, the optical SW control unit 80 controls the connection relationship of the optical SW 37 such that the port 37-1-1 and the port 37-2-1 of the optical SW 37 are connected and the port 37-1-2 and the port 37-2-2 of the optical SW 37 are connected. Accordingly, the optical signal input to the optical SW 37 can be output to the output destination according to the wavelength.

Next, a flow of processing of the optical access system 1b according to the third embodiment will be described.

The respective subscriber devices 10-1 to 10-3 transmit optical signals having different wavelengths. Optical signals transmitted from the respective subscriber devices 10-1 to 10-3 are input to the optical SW 70-1. For example, an optical signal transmitted from the subscriber device 10-1 is input to the port 71-1-1 of the optical SW 70-1. Similarly, an optical signal transmitted from the subscriber device 10-2 is input to the port 71-1-2 of the optical SW 70-1. Similarly, an optical signal transmitted from the subscriber device 10-3 is input to the port 71-1-P1 (for example, P1 is 3) of the optical SW 70-1.

It is assumed that the connection relationship between the port 71 and the port 72 in the optical SW 70-1 is set by the optical SW control unit 80 based on the optical transmission line information and the optical signal wavelength information. In FIG. 4, it is assumed that the optical SW control unit 80 controls the optical SW 70-1 such that the port 71-1-1 and the port 72-1-1 are connected, the port 71-1-2 and the port 72-1-2 are connected, and the port 71-1-P1 and the port 72-1-Q1 (for example, Q1 is 9) are connected. Therefore, the optical signal having the wavelength λ1 input to the port 71-1-1 is output from the port 72-1-1, the optical signal having the wavelength λ2 input to the port 71-1-2 is output from the port 72-1-2, and the optical signal having the wavelength λ3 input to the port 71-1-P1 is output from the port 72-1-Q1.

The optical multiplexer/demultiplexer 75-1 is connected to the ports 72-1-1 and 72-1-2. Therefore, the optical multiplexer/demultiplexer 75-1 multiplexes the optical signal having the wavelength λ1 output from the port 72-1-1 and the optical signal having the wavelength λ2 output from the port 72-1-2, and outputs the multiplexed optical signals to the optical transmission line 40-1. The optical multiplexer/demultiplexer 75-3 is connected to the port 72-1-Q1. Therefore, the optical multiplexer/demultiplexer 75-3 outputs the optical signal having the wavelength λ3 output from the port 72-1-Q1 to the optical transmission line 40-3.

The optical signal output from the optical multiplexer/demultiplexer 75-1 is input to the power splitter 50-1 via the optical transmission line 40-1. The power splitter 50-1 splits the input optical signals having the wavelengths λ1 and λ2 into a first path and a second path. Accordingly, the optical signals having the wavelengths λ1 and λ2 are input to the wavelength demultiplexer 33-1 of the management control device 30b.

The wavelength demultiplexer 33-1 demultiplexes the input optical signal. The optical signal demultiplexed by the wavelength demultiplexer 33-1 is input to the port 37-1 of the optical SW 37.

The optical signal output from the optical multiplexer/demultiplexer 75-3 is input to the power splitter 50-3 via the optical transmission line 40-3. The power splitter 50-3 splits the input optical signal having the wavelength λ3 into a first path and a second path. Accordingly, the optical signal having the wavelength λ3 is input to the wavelength demultiplexer 33-3 of the management control device 30b.

The wavelength demultiplexer 33-3 demultiplexes the input optical signal. The optical signal demultiplexed by the wavelength demultiplexer 33-3 is input to the port 37-1 of the optical SW 37.

It is assumed that the connection relationship between the port 37-1 and the port 37-2 in the optical SW 37 is set by the optical SW control unit 80 based on the optical transmission line information and the optical signal wavelength information. In FIG. 4, it is assumed that the optical SW control unit 80 controls the optical SW 70-1 such that the port 37-1-1 and the port 37-2-1 are connected, the port 37-1-2 and the port 37-2-2 are connected, and the port 37-1-P3 and the port 37-2-Q3 (for example, P3 is 9 and Q3 is 3) are connected.

Therefore, the optical signal having the wavelength λ1 input to the port 37-1-1 is output from the port 37-2-1, the optical signal having the wavelength λ2 input to the port 37-1-2 is output from the port 37-2-2, and the optical signal having the wavelength 13 input to the port 37-1-P3 is output from the port 37-2-Q3.

The reception unit 34-1 included in the monitoring circuit 31b is connected to the port 37-2-1. Therefore, the reception unit 34-1 converts the optical signal having the wavelength λ1 output from the port 37-2-1 into an electrical signal. The reception unit 34-1 outputs the converted electrical signal to the AMCC signal separation unit 35-1. The AMCC signal separation unit 35-1 separates the AMCC signal from the input electrical signal. Accordingly, the AMCC signal separation unit 35-1 can acquire the AMCC signal superimposed on the optical signal having the wavelength λ1.

The reception unit 34-2 included in the monitoring circuit 31b is connected to the port 37-2-2. Therefore, the reception unit 34-2 converts the optical signal having the wavelength λ2 output from the port 37-2-2 into an electrical signal. The reception unit 34-2 outputs the converted electrical signal to the AMCC signal separation unit 35-2.

The AMCC signal separation unit 35-2 separates the AMCC signal from the input electrical signal. Accordingly, the AMCC signal separation unit 35-2 can acquire the AMCC signal superimposed on the optical signal having the wavelength 12.

The reception unit 34-3 included in the monitoring circuit 31b is connected to the port 37-2-Q3. Therefore, the reception unit 34-3 converts the optical signal having the wavelength λ3 output from the port 37-2-Q3 into an electrical signal. The reception unit 34-3 outputs the converted electrical signal to the AMCC signal separation unit 35-3. The AMCC signal separation unit 35-3 separates the AMCC signal from the input electrical signal. Accordingly, the AMCC signal separation unit 35-3 can acquire the AMCC signal superimposed on the optical signal having the wavelength λ3.

The optical signals split into the second path by the power splitters 50-1 to 50-3 are processed in the same manner as the processing described in the second embodiment.

According to the optical access system 1b configured as described above, only the port to which the optical signal is input is selected by using the optical SW 37 and connected to the monitoring circuit 31*b*, so that the number of sets of the reception unit 34 (for example, PD) and the AMCC signal separation unit 35 (for example, LPF) necessary for monitoring may be the same as the number of subscriber device pairs performing communication. Therefore, it is not necessary to provide a monitoring circuit for each optical transmission line as in the related art. Accordingly, the number of monitoring circuits 31 can be reduced. That is, the number of LPFs and PDs can be reduced. Therefore, in the optical access system that communicates through the plurality of optical transmission lines, it is possible to monitor a large number of control signals with a smaller configuration.

Fourth Embodiment

In the first to third embodiments, the number of the subscriber devices 10 and 20 is three, and a configuration in which different wavelengths are used between the subscriber devices 10 and between the subscriber devices 20 has been described. In a fourth embodiment, a configuration in a case where the number of the subscriber devices 10 and 20 is four and wavelengths used by some of the subscriber devices 10 and 20 overlap will be described.

Figure 5:
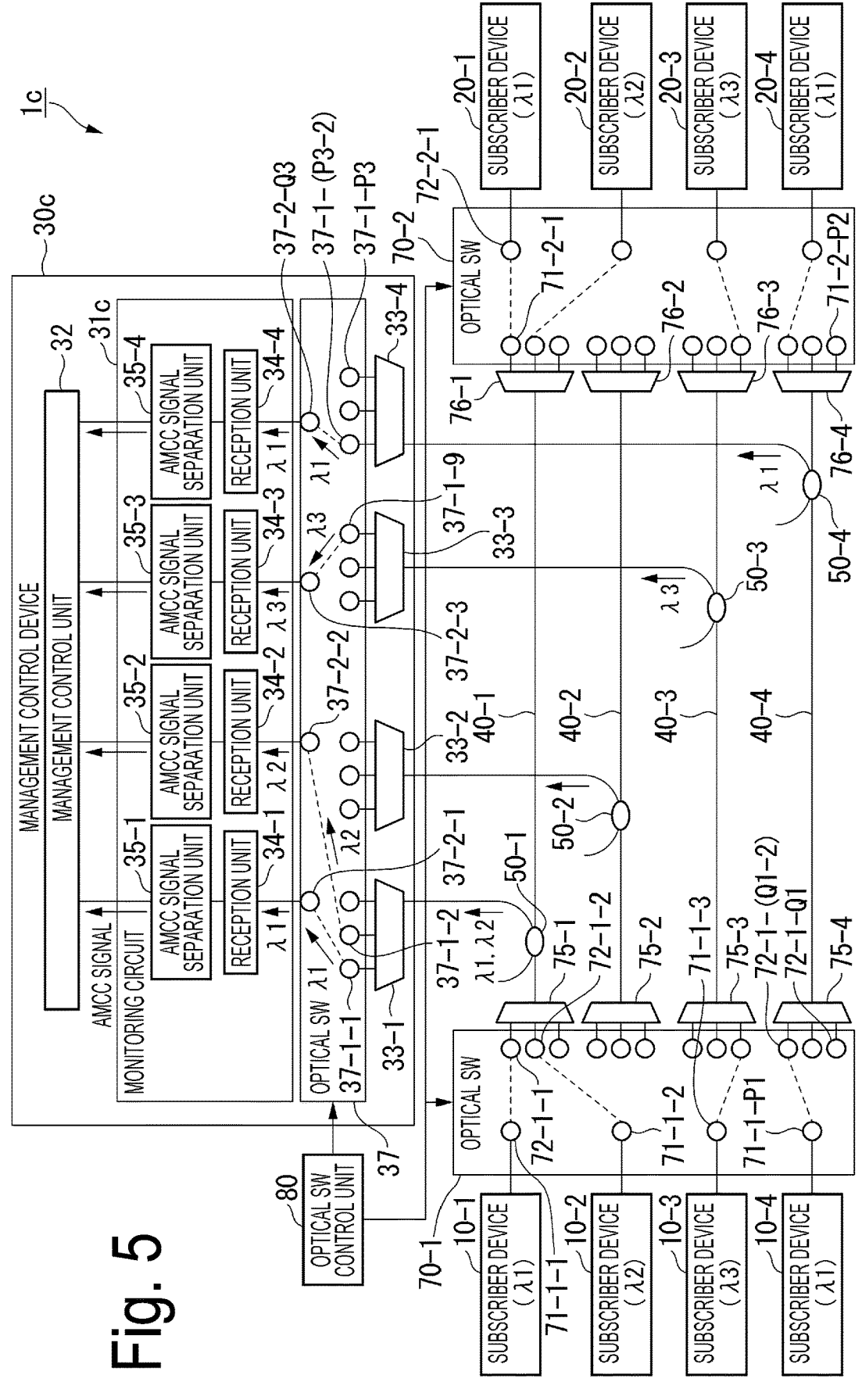
FIG. 5 is a diagram illustrating a configuration example of an optical access system according to a fourth embodiment.

FIG. 5 is a diagram illustrating a configuration example of an optical access system 1*c* according to the fourth embodiment. The optical access system 1*c* includes a plurality of subscriber devices 10-1 to 10-4, a plurality of subscriber devices 20-1 to 20-4, a management control device 30*c*, a plurality of power splitters 50-1 to 50-4, a plurality of optical SWs 70-1 and 70-2, a plurality of optical multiplexers/demultiplexers 75-1 to 75-4 and 76-1 to 76-4, and an optical SW control unit 80.

The optical access system 1*c* has a configuration different from that of the optical access system 1*b* in that the number of the subscriber devices 10, the subscriber devices 20, the power splitters 50, the optical multiplexers/demultiplexers 75, and the optical multiplexers/demultiplexers 76 is larger than that of the optical access system 1*b*, and the management control device 30*c* is provided instead of the management control device 30*b*. Other configurations of the optical access system 1*c* are similar to those of the optical access system 1*b*. Therefore, differences from the optical access system 1*b* will be mainly described below. Note that, in the subscriber device 10, the subscriber device 20, the power splitter 50, the optical multiplexer/demultiplexer 75, and the optical multiplexer/demultiplexer 76, in a case where the basic processing does not change only due to an increase in the number of devices, description thereof will be omitted.

As in the first to third embodiments, the subscriber devices 10-1 to 10-3 transmit optical signals having wavelengths λ1 to λ3. In the fourth embodiment, the subscriber device 10-4 transmits an optical signal having a wavelength λ1, for example, similarly to the subscriber device 10-1. Note that the subscriber device 10-4 may have any wavelength as long as the wavelength overlaps with other subscriber devices 10. Furthermore, in the fourth embodiment, for the sake of simplicity of description, a case where the number of the subscriber devices 10 and 20 is four is illustrated, but the number may be five or more.

Since the subscriber device 10-1 and the subscriber device 10-4 perform communication using the same wavelength, it is necessary to perform control such that optical signals are transmitted through different optical transmission lines 40 so as not to be mixed. Such control is performed by the optical SW control unit 80. For example, the optical SW control unit

80 controls the connection relationship between the input port and the output port of the optical SW 70-1 such that the subscriber devices 10 that perform communication using the same wavelength do not transmit optical signals to the same optical transmission line 40. In the example illustrated in FIG. 5, the optical SW control unit 80 controls the connection relationship between the input port and the output port of the optical SW 70-1 such that the optical signal having the wavelength λ1 transmitted from the subscriber device 10-4 is transmitted via the optical transmission line 40-4. The power splitter 50-4 is provided in the optical transmission line 40-4.

The subscriber devices 20-1 to 20-3 perform communication using the wavelengths λ1 to λ3 as in the first to third embodiments. In the fourth embodiment, it is assumed that the subscriber device 20-4 transmits an optical signal having a wavelength λ1, for example, similarly to the subscriber device 20-1. Note that the subscriber device 20-4 may have any wavelength as long as the wavelength overlaps with other subscriber devices 20.

The management control device 30*c* monitors the AMCC signal and performs control based on the AMCC signal. The management control device 30*c* includes a monitoring circuit 31*c*, a management control unit 32, a plurality of wavelength demultiplexers 33-1 to 33-4, and an optical SW 37. The monitoring circuit 31*c* includes a plurality of reception units 34-1 to 34-4, and a plurality of AMCC signal separation units 35-1 to 35-4. The monitoring circuit 31*c* has a configuration different from that of the monitoring circuit 31*b* due to an increase in the number of the reception units 34 and the AMCC signal separation units 35, but basic processing is the same.

In the fourth embodiment, the wavelength demultiplexers 33-1 to 33-4 are connected to the port 37-1 of the optical SW 37 via optical transmission lines, and the monitoring circuit 31*c* is connected to the port 37-2 of the optical SW 37 via an optical transmission line. For example, the reception units 34-1 to 34-4 of the monitoring circuit 31*b* are connected to the port 37-2 of the optical SW 37. The connection between the port 37-1 and the port 37-2 is controlled by the optical SW control unit 80 such that the optical signal input to the port 37-1 of the optical SW 37 is output from the designated port 37-2.

In the fourth embodiment, optical signals having the same wavelength transmitted from different subscriber devices 10 are input to the management control device 30*c*. When optical signals having the same wavelength transmitted from different subscriber devices 10 are input to the same reception unit 34, the AMCC signal cannot be correctly extracted. Therefore, the optical SW control unit 80 controls the connection relationship between the port 37-1 and the port 37-2 such that optical signals having the same wavelength transmitted from different subscriber devices 10 are not input to the same reception unit 34.

Here, a description will be given assuming that the optical signals having the wavelengths λ1 and λ2 are input to the wavelength demultiplexer 33-1 and the optical signal having the wavelength λ1 is input to the wavelength demultiplexer 33-4. The optical SW control unit 80 performs control such that the optical signal having the wavelength λ1 output from the wavelength demultiplexer 33-1 and input to the port 37-1 of the optical SW 37 is output from the port 37-2-1 to which the reception unit 34-1 is connected, and performs control such that the optical signal having the wavelength λ1 output from the wavelength demultiplexer 33-4 and input to the port 37-1 of the optical SW 37 is output from the port 37-2-Q3 to which the reception unit 34-4 is connected.

Accordingly, optical signals having the same wavelength transmitted from different transmission sources input to the optical SW 37 can be output to different output destinations.

Next, a flow of processing of the optical access system 1c according to the fourth embodiment will be described. Here, it is assumed that the subscriber device 10-1 and the subscriber device 10-4 perform communication using the same wavelength (wavelength λ1). Processing in which optical signals having the same wavelength are transmitted will be mainly described instead of the entire processing of the optical access system 1c.

The subscriber devices 10-1 to 10-4 transmit optical signals having assigned wavelengths. Optical signals transmitted from the respective subscriber devices 10-1 to 10-4 are input to the optical SW 70-1. For example, an optical signal transmitted from the subscriber device 10-1 is input to the port 71-1-1 of the optical SW 70-1. Similarly, an optical signal transmitted from the subscriber device 10-2 is input to the port 71-1-2 of the optical SW 70-1. Similarly, an optical signal transmitted from the subscriber device 10-3 is input to the port 71-1-3 of the optical SW 70-1. Similarly, an optical signal transmitted from the subscriber device 10-4 is input to the port 71-1-P1 (for example, P1 is 4) of the optical SW 70-1.

It is assumed that the connection relationship between the port 71 and the port 72 in the optical SW 70-1 is set by the optical SW control unit 80 based on the optical transmission line information and the optical signal wavelength information. In FIG. 5, it is assumed that the optical SW control unit 80 controls the optical SW 70-1 such that the port 71-1-1 and the port 72-1-1 are connected, the port 71-1-2 and the port 72-1-2 are connected, and the port 71-1-P1 and the port 72-1-(Q1-2) (for example, Q1 is 12) are connected. Accordingly, optical signals having the same wavelength transmitted from the subscriber device 10-1 and the subscriber device 10-4 are transmitted through different optical transmission lines 40.

The optical signal having the wavelength λ1 input to the port 71-1-1 is output from the port 72-1-1, the optical signal having the wavelength λ2 input to the port 71-1-2 is output from the port 72-1-2, and the optical signal having the wavelength λ1 input to the port 71-1-P1 is output from the port 72-1-(Q1-2).

The optical multiplexer/demultiplexer 75-1 is connected to the ports 72-1-1 and 72-1-2. Therefore, the optical multiplexer/demultiplexer 75-1 multiplexes the optical signal having the wavelength λ1 and the optical signal having the wavelength λ2 output from the ports 72-1-1 and 72-1-2, and outputs the multiplexed optical signal to the optical transmission line 40-1. The optical multiplexer/demultiplexer 75-4 is connected to the port 72-1-(Q1-2). Therefore, the optical multiplexer/demultiplexer 75-4 outputs the optical signal having the wavelength λ1 output from the port 72-1-(Q1-2) to the optical transmission line 40-4.

The optical signal output from the optical multiplexer/demultiplexer 75-1 is processed in the same manner as in the third embodiment. That is, the optical signal output from the optical multiplexer/demultiplexer 75-1 is converted into an electrical signal in the monitoring circuit 31c, and the AMCC signal is extracted.

The optical signal output from the optical multiplexer/demultiplexer 75-4 is input to the power splitter 50-4 via the optical transmission line 40-4. The power splitter 50-4 splits the input optical signal having the wavelength λ1 into a first path and a second path. Accordingly, the optical signal having the wavelength λ1 is input to the wavelength demultiplexer 33-4 of the management control device 30c.

The wavelength demultiplexer 33-4 demultiplexes the input optical signal. The optical signal demultiplexed by the wavelength demultiplexer 33-4 is input to the port 37-1 of the optical SW 37. It is assumed that the connection relationship between the port 37-1 and the port 37-2 in the optical SW 37 is set by the optical SW control unit 80 based on the optical transmission line information and the optical signal wavelength information. In FIG. 5, it is assumed that the port 37-1-1 and the port 37-2-1 are connected, the port 37-1-2 and the port 37-2-2 are connected, the port 37-1-9 and the port 37-2-3 are connected, and the port 37-1-(P3-2) and the port 37-2-Q3 (for example, P3 is 12 and Q3 is 4) are connected.

The optical signal having the wavelength λ1 input to the port 37-1-(P3-2) is output from the port 37-2-Q3. The reception unit 34-4 included in the monitoring circuit 31b is connected to the port 37-2-Q3. Therefore, the reception unit 34-4 converts the optical signal having the wavelength λ1 output from the port 37-2-Q3 into an electrical signal. The reception unit 34-4 outputs the converted electrical signal to the AMCC signal separation unit 35-4. The AMCC signal separation unit 35-4 separates the AMCC signal from the input electrical signal. Accordingly, the AMCC signal separation unit 35-4 can acquire the AMCC signal superimposed on the optical signal having the wavelength λ1 transmitted by the subscriber device 10-4.

The optical signals split into the second path by the power splitters 50-1 to 50-4 are processed in the same manner as the processing described in the second embodiment.

According to the optical access system 1c configured as described above, by adding a set of the reception unit 34 and the AMCC signal separation unit 35 in the monitoring circuit 31c in accordance with the number of subscriber device pairs communicating with each other, it is possible to acquire the AMCC signal even in a case where there are a plurality of optical signals communicating via the same wavelength and different optical transmission lines.

Modification of Fourth Embodiment

Figure 6:
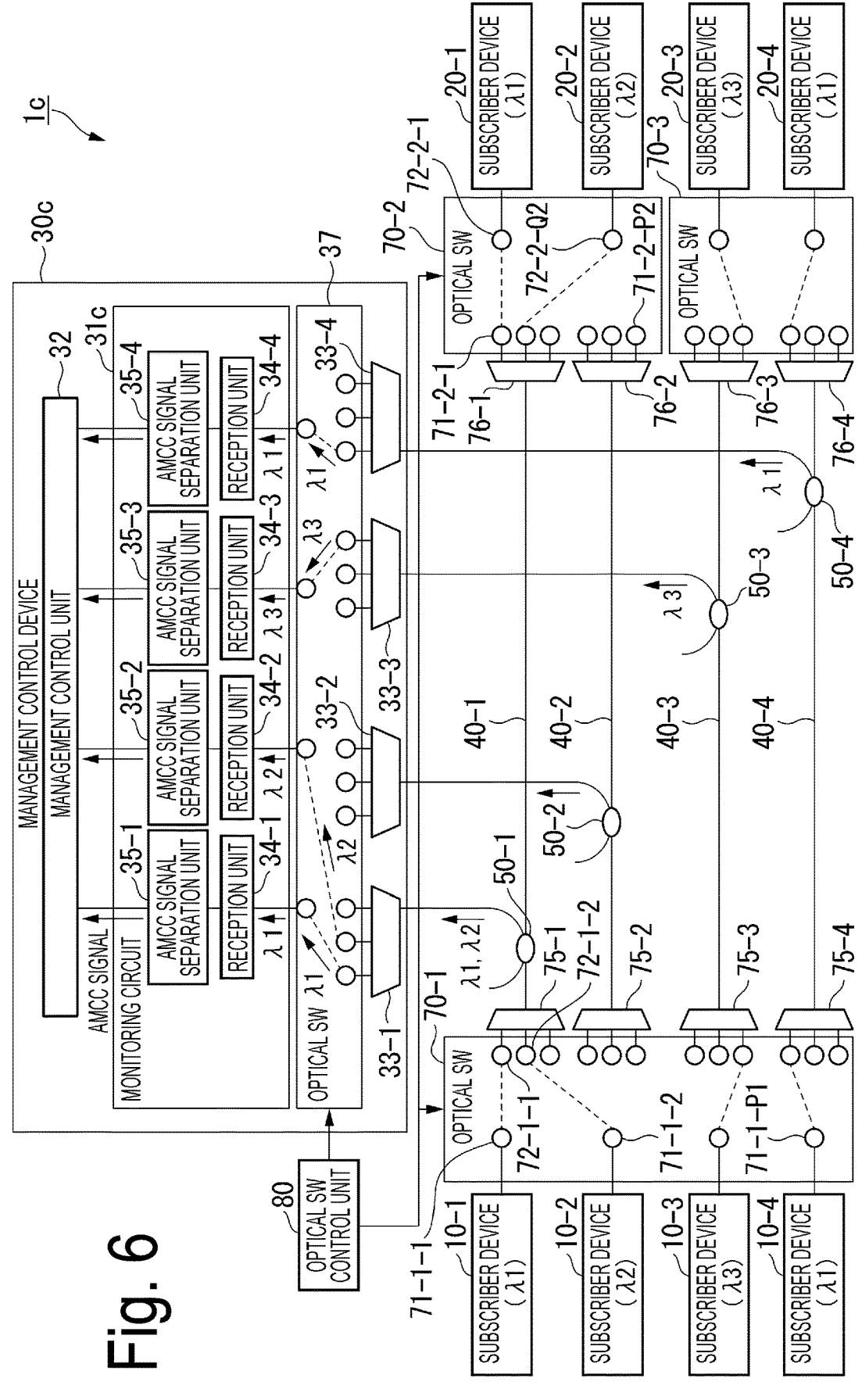
FIG. 6 is a diagram illustrating a configuration example of the optical access system according to a modification of the fourth embodiment.

Although FIG. 5 illustrates the configuration in which the subscriber devices 20-1 to 20-4 are accommodated in one optical SW 70-2, some of the subscriber devices 20-1 to 20-4 may be configured to be accommodated in another optical SW as illustrated in FIG. 6. FIG. 6 is a diagram illustrating a configuration example of the optical access system 1c according to a modification of the fourth embodiment. The optical access system 1c according to the modification of the fourth embodiment includes a plurality of subscriber devices 10-1 to 10-4, a plurality of subscriber devices 20-1 to 20-4, a management control device 30c, a plurality of power splitters 50-1 to 50-4, a plurality of optical SWs 70-1, 70-2, and 70-3, a plurality of optical multiplexers/demultiplexers 75-1 to 75-4 and 76-1 to 76-4, and an optical SW control unit 80.

The optical access system 1c according to the modification of the fourth embodiment illustrated in FIG. 6 has a configuration different from that of the optical access system 1c according to the fourth embodiment illustrated in FIG. 5 in that the optical SW 70-3 is newly provided. In the optical access system 1c according to the fourth embodiment illustrated in FIG. 5, the optical SW 70-2 accommodates the subscriber device 20-n, whereas in the optical access system 1c according to the modification of the fourth embodiment illustrated in FIG. 6, the optical SW 70-2 accommodates the subscriber devices 20-1 and 20-2, and the optical SW 70-3 accommodates the subscriber devices 20-3 and 20-4.

As described above, for example, the subscriber devices 20 using the same wavelength may be accommodated in different optical SWs. The optical SW 70-3 has the same configuration as the optical SW 70-2. In the optical SW 70-3, a connection relationship between an input port and an output port is controlled by the optical SW control unit 80.

With such a configuration, the subscriber devices 20 that perform communication using the same wavelength are accommodated in different optical SWs, whereby an optical signal is not transferred to the subscriber device 20 that performs communication using the same wavelength due to an error in path control but has a different destination. Furthermore, optical signals having the same wavelength are not transmitted through the same optical transmission line 40. Therefore, it is possible to reduce the likelihood that the AMCC signal cannot be extracted due to the mixture of the optical signals having the same wavelength.

In the fourth embodiment, the subscriber device 10-$n$ may also be configured such that some of the subscriber devices 10-$n$ are provided in another optical SW. In this case, the subscriber devices 10 using the same wavelength may be accommodated in different optical SWs.

Fifth Embodiment

In the third and fourth embodiments, the configuration in which the optical SW control unit designates the connection relationship of the optical SW provided in the monitoring circuit has been described. In a fifth embodiment, a configuration in which an optical SW control unit does not designate a connection relationship of an optical SW provided in a monitoring circuit will be described. In this case, the optical SW provided in the monitoring circuit includes a power monitor at an input port, and is configured to be connected to a designated output port only when an optical signal is detected.

Figure 7:
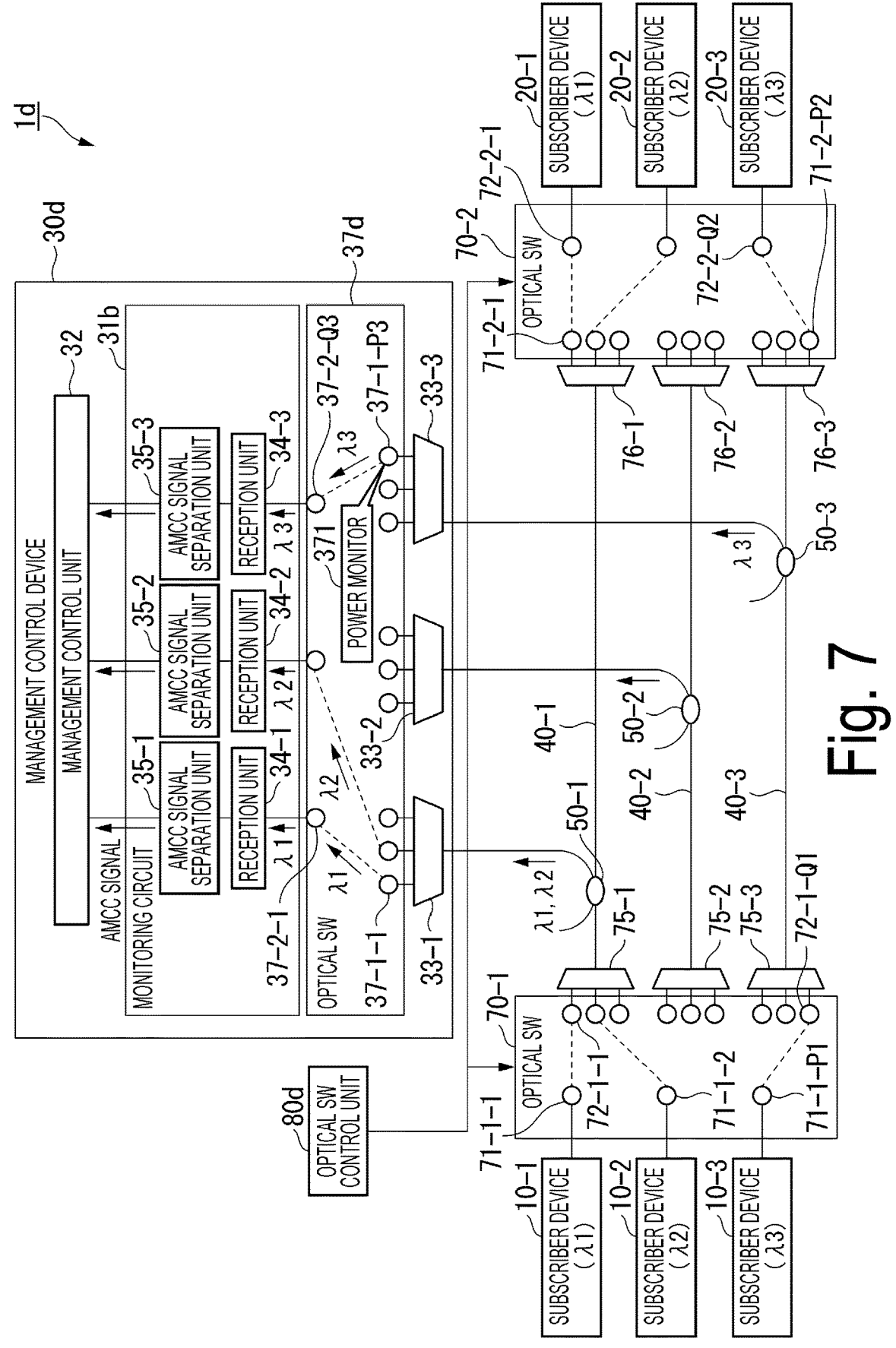
FIG. 7 is a diagram illustrating a configuration example of an optical access system according to a fifth embodiment.
Figure 8:
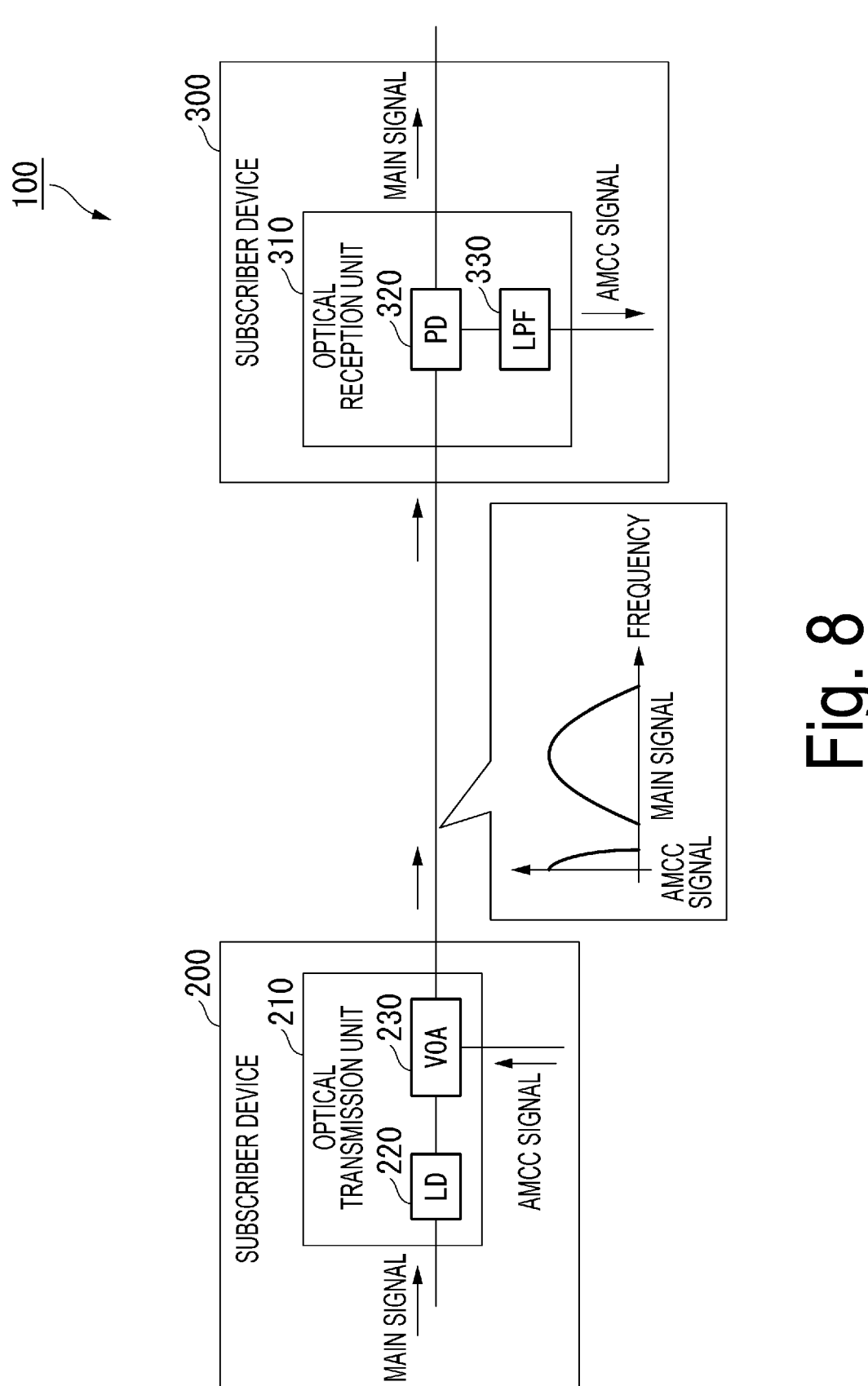
FIG. 8 is a diagram illustrating a configuration of a PtP WDM system using a "baseband modulation" method.

FIG. 7 is a diagram illustrating a configuration example of an optical access system 1$d$ according to the fifth embodiment. The optical access system 1$d$ includes a plurality of subscriber devices 10-1 to 10-3, a plurality of subscriber devices 20-1 to 20-3, a management control device 30$d$, a plurality of power splitters 50-1 to 50-3, a plurality of optical SWs 70-1 and 70-2, a plurality of optical multiplexers/demultiplexers 75-1 to 75-3 and 76-1 to 76-3, and an optical SW control unit 80$d$.

The optical access system 1$d$ has a configuration different from that of the optical access system 1$b$ in that the management control device 30$d$ is provided instead of the management control device 30$b$. Other configurations of the optical access system 1$d$ are similar to those of the optical access system 1$b$. Therefore, differences from the optical access system 1$b$ will be mainly described below.

The optical SW control unit 80$d$ controls each of the optical SWs 70-1 and 70-2. The optical SW control unit 80$d$ performs the same processing as the optical SW control unit 80 except that the control of the optical SW 37$d$ is not performed.

The management control device 30$d$ monitors the AMCC signal and performs control based on the AMCC signal. The management control device 30$d$ includes a monitoring circuit 31$b$, a management control unit 32, a plurality of wavelength demultiplexers 33-1 to 33-3, and an optical SW 37$d$.

The optical SW 37$d$ includes ports 37-1-1 to 37-1-P3, ports 37-2-1 to 37-2-Q3, and a power monitor 371. The power monitor 371 is provided in each of the ports 37-1-1 to 37-1 to P3. The power monitor 371 detects optical signals input to the ports 37-1-1 to 37-1-P3. In a case where the optical signal is detected by the power monitor 371, the optical SW 37$d$ switches a path to output the optical signal to the designated ports 37-2-1 to 37-2-Q3.

The optical SW 37$d$ may hold information indicating a connection relationship between the ports 37-1-1 to 37-1-P3 where the optical signal is detected and the ports 37-2-1 to 37-2-Q3, and switch the path according to the detection result of the power monitor 371. The information indicating the connection relationship between the ports 37-1-1 to 37-1-P3 and the ports 37-2-1 to 37-2-Q3 is information indicating the port 37-1 where the optical signal is detected and the port 37-2 to be connected. For example, as information indicating a connection relationship between the ports 37-1-1 to 37-1-P3 and the ports 37-2-1 to 37-2-Q3, it only needs to indicate that, in a case where an optical signal is detected in the port 37-1-1, the port 37-1-1 is only required to be connected to the port 37-2-1.

According to the optical access system 1$d$ configured as described above, effects similar to those of the third embodiment can be obtained.

Furthermore, in the optical access system 1$d$, the function performed by the optical SW control unit 80$d$ can be reduced by providing the power monitor 371 in the optical SW 37$d$.

Modification of Fifth Embodiment

As in the fourth embodiment, the optical access system 1$d$ may be configured to include the subscriber devices 10 and 20 that perform communication using the same wavelength. Specific processing in the case of including the subscriber devices 10 and 20 that perform communication using the same wavelength is similar to that in the fourth embodiment.

Modifications of First to Fifth Embodiments

In the first to fifth embodiments, the configuration using "baseband modulation," which is a method of superimposing the AMCC signal on the main signal as the baseband signal on the transmitter side, has been illustrated in both the subscriber devices 10 and 20. However, "low-frequency pilot tone," which is a method of up-converting the AMCC signal to a certain carrier frequency and superimposing the AMCC signal on the main signal on the transmitter side, may be used.

In the first to fifth embodiments, the configuration in which the AMCC signal is superimposed at the optical stage on the transmitting side and the AMCC signal is separated at the electrical stage on the receiving side has been illustrated in both the subscriber devices 10 and 20. However, the AMCC signal may be superimposed at the electrical stage on the transmitting side and the AMCC signal may be separated at the electrical stage on the receiving side.

Some functions of the management control devices 30, 30$b$, 30$c$, and 30$d$ may be provided outside.

Some functional units of the management control devices 30, 30$b$, 30$c$, and 30$d$ in the above-described embodiments may be implemented by computers. In such a case, a program for implementing the functions may be recorded in a computer-readable recording medium, and the functions may be implemented by loading the program recorded on this recording medium to a computer system, and executing the program. Note that the "computer system" mentioned herein includes an OS and hardware such as peripheral devices.

Also, the "computer-readable recording medium" is a portable medium such as a flexible disk, a magneto-optical disc, a ROM, or a CD-ROM, or a storage device such as a hard disk embedded in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the foregoing program may be for implementing some of the functions described above, may be implemented in a combination of the functions described above and a program already recorded in a computer system, or may be implemented with a programmable logic device such as a field programmable gate array (FPGA).

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention can be applied to a technique for monitoring a management control signal (AMCC signal) in an optical access system that communicates through a plurality of optical transmission lines.

REFERENCE SIGNS LIST

10-1 to 10-4, 20-1 to 20-4 Subscriber device
30, 30*b*, 30*c*, 30*d* Management control device
31, 31*b*, 31*c* Monitoring circuit
32 Management control unit
33, 33-1 to 33-4 wavelength demultiplexer
34-1 to 34-4 Reception unit
35-1 to 35-4 AMCC signal separation unit
50-1 to 50-4 Power splitter
60 Optical coupler
37, 37*d*, 70-1 to 70-3 Optical SW
75-1 to 75-4, 76-1 to 76-4 Optical multiplexer/demultiplexer
80 Optical SW control unit
371 Power monitor

The invention claimed is:

1. An optical access system that performs communication using an optical signals on which management control signals used for management and control are superimposed in a plurality of transmission lines connecting a plurality of subscriber devices, the optical access system comprising:

a plurality of splitters that are provided for the respective transmission lines and split a plurality of optical signals transmitted from the plurality of subscriber devices;

a monitor configured to acquire the management control signal from each of the plurality of optical signals split by each of the plurality of splitters; and an output device that is provided between the monitor and the plurality of splitters and outputs the plurality of optical signals split by the plurality of splitters to the monitor, wherein the monitor includes a plurality of receivers configured to convert each of the plurality of optical signals output from the output device into electrical signal, and a plurality of management control signal separators that acquire the management control signal from the electrical signal.

2. The optical access system according to claim 1, wherein the monitor further includes a wavelength demultiplexer configured to demultiplex an optical signal for each wavelength, wherein the plurality of receivers converts the demultiplexed optical signal into the electrical signal, the output device is a multiplexer, the multiplexer multiplexes a plurality of optical signals split by the plurality of splitters and outputs the multiplexed optical signals to the wavelength demultiplexer, and the wavelength demultiplexer demultiplexes the optical signal multiplexed by the multiplexer for each wavelength and outputs the demultiplexed optical signal to the plurality of receivers.

3. The optical access system according to claim 1, further comprising:

a first optical switch configured to connect to the plurality of subscriber devices; and a plurality of optical multiplexers/demultiplexers that are provided for the respective transmission lines, multiplex the optical signals output from the first optical switch, and demultiplex the optical signals transmitted from the transmission lines, wherein the plurality of splitters split the optical signals output from the plurality of optical multiplexers/demultiplexers, respectively.

4. The optical access system according to claim 3, wherein the output device is a second optical switch, the optical access system further comprises a plurality of wavelength demultiplexers configured to demultiplex a plurality of optical signals split by the plurality of splitters for each wavelength, wherein the plurality of receivers converts the plurality of optical signals output from the second optical switch into the electrical signal, the plurality of wavelength demultiplexers output the optical signal demultiplexed for each wavelength to the second optical switch, and the second optical switch switches a path to connect a port to which the optical signal demultiplexed by the plurality of wavelength demultiplexers is input and a designated output port.

5. The optical access system according to claim 4, wherein the second optical switch further includes a detector that detects an optical signal, and in a case where the optical signal is detected by the detector, the second optical switch switches a path to connect a port where the optical signal is detected and a designated output port.

6. The optical access system according to claim 4, wherein some of the plurality of subscriber devices transmit optical signals having the same wavelength to the first optical switch, the first optical switch switches a path to connect an input port and a designated output port such that optical signals having the same wavelength transmitted from some of the plurality of subscriber devices are not transmitted through the same transmission line, and the second optical switch switches a path to connect an input port and a designated output port such that optical signals having the same wavelength output from the plurality of wavelength demultiplexers are not output to the same receiver.

7. A monitoring method in an optical access system that performs communication using an optical signal on which management control signal used for management and control are superimposed in a plurality of transmission lines connecting a plurality of subscriber devices, the monitoring method comprising:

splitting, when provided for the respective transmission lines, a plurality of optical signals transmitted from the plurality of subscriber devices; and outputting, by an output device provided between a monitor and a plurality of splitters that split a plurality of optical signals, the plurality of optical signals split by the plurality of splitters to the monitor, the monitor acquiring the management control signal from each of the plurality of split optical signals, converting, by a plurality of receivers provided in the monitor, each of the plurality of optical signals output from the output device into electrical signal, and acquiring, by a plurality of management control signal separators provided in the monitor, the management control signal from the electrical signal.

\*  \*  \*  \*  \*